(12) United States Patent
Pleis et al.

(10) Patent No.: US 8,527,949 B1
(45) Date of Patent: *Sep. 3, 2013

(54) GRAPHICAL USER INTERFACE FOR DYNAMICALLY RECONFIGURING A PROGRAMMABLE DEVICE

(75) Inventors: Mathew A Pleis, Carnation, WA (US); Kenneth Y Ogami, Bothel, WA (US); Marat Zhaksilikov, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/182,431

(22) Filed: Jul. 13, 2011

Related U.S. Application Data

(63) Continuation of application No. 10/256,829, filed on Sep. 27, 2002, which is a continuation of application No. 09/989,817, filed on Nov. 19, 2001, now Pat. No. 6,971,004.

(51) Int. Cl.
*G06F 9/45* (2006.01)

(52) U.S. Cl.
USPC ......................................................... 717/121

(58) Field of Classification Search
USPC ......................................................... 717/121
See application file for complete search history.

(56) References Cited

U.S. PATENT DOCUMENTS

| | | | |
|---|---|---|---|
| 3,600,690 | A | 8/1971 | White |
| 3,805,245 | A | 4/1974 | Brooks et al. |
| 3,940,760 | A | 2/1976 | Brokaw |
| 4,061,987 | A | 12/1977 | Nagahama |
| 4,134,073 | A | 1/1979 | MacGregor |
| 4,176,258 | A | 11/1979 | Jackson |
| 4,272,760 | A | 6/1981 | Prazak et al. |
| 4,283,713 | A | 8/1981 | Philipp |
| 4,344,067 | A | 8/1982 | Lee |

(Continued)

FOREIGN PATENT DOCUMENTS

| | | |
|---|---|---|
| EM | 1205848 A1 | 5/2002 |
| EP | 368398 A1 | 5/1990 |

(Continued)

OTHER PUBLICATIONS

Pleis et al., U.S. Appl. No. 10/256,829, Jan. 26, 2010 (Claims).*

(Continued)

*Primary Examiner* — John Chavis

(57) ABSTRACT

An interface, system and method enabling dynamic reconfiguration of an electronic device in a convenient and efficient manner. The interface enables basic operations, such as adding or deleting a device configuration and switching between different device configuration views/workspaces. In some embodiments, the system and method apply global device parameter values to each device configuration and/or allow only valid or legal states for device configurations beyond the first configuration. In another embodiment, the electronic device includes a microprocessor, a plurality of internal peripherals, an interconnecting component, an external coupling port, and a memory for storing instructions. The plurality of internal peripherals, the interconnecting component and the external coupling port are programmably configurable to perform a variety of functions. The memory stores a plurality of configuration images that define the configuration and configuration of the plurality of internal peripherals, the interconnecting component and the external coupling port. The instructions stored by the memory facilitate dynamic reconfiguration of the electronic device. Based upon the existence of a predetermined condition, the electronic device is automatically reconfigured by activating different configuration images.

20 Claims, 6 Drawing Sheets

(56) References Cited

U.S. PATENT DOCUMENTS

| | | |
|---|---|---|
| 4,380,083 A | 4/1983 | Andersson et al. |
| 4,438,404 A | 3/1984 | Philipp |
| 4,475,151 A | 10/1984 | Philipp |
| 4,497,575 A | 2/1985 | Philipp |
| 4,571,507 A | 2/1986 | Collings |
| 4,608,502 A | 8/1986 | Dijkmans et al. |
| 4,670,838 A | 6/1987 | Kawata |
| 4,689,740 A | 8/1987 | Moelands et al. |
| 4,692,718 A | 9/1987 | Roza et al. |
| 4,736,097 A | 4/1988 | Philipp |
| 4,740,966 A | 4/1988 | Goad |
| 4,773,024 A | 9/1988 | Faggin et al. |
| 4,794,558 A | 12/1988 | Thompson |
| 4,802,103 A | 1/1989 | Faggin et al. |
| 4,802,119 A | 1/1989 | Heene et al. |
| 4,807,183 A | 2/1989 | Kung et al. |
| 4,812,684 A | 3/1989 | Yamagiwa et al. |
| 4,827,401 A | 5/1989 | Hrustich et al. |
| 4,868,525 A | 9/1989 | Dias |
| 4,876,534 A | 10/1989 | Mead et al. |
| 4,878,200 A | 10/1989 | Asghar et al. |
| 4,879,461 A | 11/1989 | Philipp |
| 4,935,702 A | 6/1990 | Mead et al. |
| 4,939,637 A | 7/1990 | Pawloski |
| 4,942,540 A | 7/1990 | Black et al. |
| 4,947,169 A | 8/1990 | Smith et al. |
| 4,953,928 A | 9/1990 | Anderson et al. |
| 4,962,342 A | 10/1990 | Mead et al. |
| 4,964,074 A | 10/1990 | Suzuki et al. |
| 4,969,087 A | 11/1990 | Tanagawa et al. |
| 4,970,408 A | 11/1990 | Hanke et al. |
| 4,999,519 A | 3/1991 | Kitsukawa et al. |
| 5,049,758 A | 9/1991 | Mead et al. |
| 5,050,168 A | 9/1991 | Paterson |
| 5,053,949 A | 10/1991 | Allison et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,087,822 A | 2/1992 | Warren |
| 5,095,284 A | 3/1992 | Mead |
| 5,097,305 A | 3/1992 | Mead et al. |
| 5,099,191 A | 3/1992 | Galler et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,127,103 A | 6/1992 | Hill et al. |
| 5,136,188 A | 8/1992 | Ha et al. |
| 5,140,197 A | 8/1992 | Grider |
| 5,144,582 A | 9/1992 | Steele |
| 5,146,106 A | 9/1992 | Anderson et al. |
| 5,150,079 A | 9/1992 | Williams et al. |
| 5,155,836 A | 10/1992 | Jordan et al. |
| 5,159,335 A | 10/1992 | Veneruso |
| 5,160,899 A | 11/1992 | Anderson et al. |
| 5,165,054 A | 11/1992 | Platt et al. |
| 5,166,562 A | 11/1992 | Allen et al. |
| 5,175,884 A | 12/1992 | Suarez |
| 5,179,531 A | 1/1993 | Yamaki |
| 5,184,061 A | 2/1993 | Lee et al. |
| 5,200,751 A | 4/1993 | Smith |
| 5,204,549 A | 4/1993 | Platt et al. |
| 5,230,000 A | 7/1993 | Mozingo et al. |
| 5,241,492 A | 8/1993 | Girardeau, Jr. |
| 5,243,554 A | 9/1993 | Allen et al. |
| 5,248,843 A | 9/1993 | Billings |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,276,890 A | 1/1994 | Arai |
| 5,280,202 A | 1/1994 | Chan et al. |
| 5,289,023 A | 2/1994 | Mead |
| 5,303,329 A | 4/1994 | Mead et al. |
| 5,304,955 A | 4/1994 | Atriss et al. |
| 5,305,017 A | 4/1994 | Gerpheide |
| 5,305,312 A | 4/1994 | Fornek et al. |
| 5,307,381 A | 4/1994 | Ahuja |
| 5,313,618 A | 5/1994 | Pawloski |
| 5,317,202 A | 5/1994 | Waizman |
| 5,319,370 A | 6/1994 | Del Signore et al. |
| 5,319,771 A | 6/1994 | Takeda |
| 5,321,828 A | 6/1994 | Phillips et al. |
| 5,324,958 A | 6/1994 | Mead et al. |
| 5,325,512 A | 6/1994 | Takahashi |
| 5,329,471 A | 7/1994 | Swoboda et al. |
| 5,331,215 A | 7/1994 | Allen et al. |
| 5,331,315 A | 7/1994 | Crosette |
| 5,331,571 A | 7/1994 | Aronoff et al. |
| 5,336,936 A | 8/1994 | Allen et al. |
| 5,339,213 A | 8/1994 | O'Callaghan |
| 5,339,262 A | 8/1994 | Rostoker et al. |
| 5,341,267 A | 8/1994 | Whitten et al. |
| 5,345,195 A | 9/1994 | Cordoba et al. |
| 5,349,303 A | 9/1994 | Gerpheide |
| 5,357,626 A | 10/1994 | Johnson et al. |
| 5,371,860 A | 12/1994 | Mura et al. |
| 5,371,878 A | 12/1994 | Coker |
| 5,374,787 A | 12/1994 | Miller et al. |
| 5,377,333 A | 12/1994 | Nakagoshi et al. |
| 5,378,935 A | 1/1995 | Korhonen et al. |
| 5,381,515 A | 1/1995 | Platt et al. |
| 5,384,467 A | 1/1995 | Plimon et al. |
| 5,384,745 A | 1/1995 | Konishi et al. |
| 5,384,910 A | 1/1995 | Torres |
| 5,390,173 A | 2/1995 | Spinney et al. |
| 5,394,522 A | 2/1995 | Sanchez-Frank et al. |
| 5,396,245 A | 3/1995 | Rempfer |
| 5,408,194 A | 4/1995 | Steinbach et al. |
| 5,414,380 A | 5/1995 | Floyd et al. |
| 5,416,895 A | 5/1995 | Anderson et al. |
| 5,422,823 A | 6/1995 | Agrawal et al. |
| 5,428,319 A | 6/1995 | Marvin et al. |
| 5,430,395 A | 7/1995 | Ichimaru |
| 5,430,687 A | 7/1995 | Hung et al. |
| 5,438,672 A | 8/1995 | Dey |
| 5,440,305 A | 8/1995 | Signore et al. |
| 5,451,887 A | 9/1995 | El Ayat et al. |
| 5,455,525 A | 10/1995 | Ho et al. |
| 5,455,731 A | 10/1995 | Parkinson |
| 5,455,927 A | 10/1995 | Huang |
| 5,479,603 A | 12/1995 | Stone et al. |
| 5,479,643 A | 12/1995 | Bhaskar et al. |
| 5,479,652 A | 12/1995 | Dreyer et al. |
| 5,488,204 A | 1/1996 | Mead et al. |
| 5,491,458 A | 2/1996 | Mccune, Jr. et al. |
| 5,493,723 A | 2/1996 | Beck et al. |
| 5,495,077 A | 2/1996 | Miller et al. |
| 5,495,593 A | 2/1996 | Elmer et al. |
| 5,495,594 A | 2/1996 | Mackenna et al. |
| 5,497,119 A | 3/1996 | Tedrow et al. |
| 5,500,823 A | 3/1996 | Martin et al. |
| 5,519,854 A | 5/1996 | Watt |
| 5,521,529 A | 5/1996 | Agrawal et al. |
| 5,530,673 A | 6/1996 | Tobita et al. |
| 5,530,813 A | 6/1996 | Paulsen et al. |
| 5,537,057 A | 7/1996 | Leong et al. |
| 5,541,878 A | 7/1996 | Lemoncheck et al. |
| 5,542,055 A | 7/1996 | Amini et al. |
| 5,543,588 A | 8/1996 | Bisset et al. |
| 5,543,590 A | 8/1996 | Gillespie et al. |
| 5,543,591 A | 8/1996 | Gillespie et al. |
| 5,544,311 A | 8/1996 | Harenberg et al. |
| 5,546,433 A | 8/1996 | Tran et al. |
| 5,546,562 A | 8/1996 | Patel |
| 5,552,725 A | 9/1996 | Ray et al. |
| 5,552,748 A | 9/1996 | O'Shaughnessy |
| 5,554,951 A | 9/1996 | Gough |
| 5,555,452 A | 9/1996 | Callaway et al. |
| 5,555,907 A | 9/1996 | Philipp |

| | | | | | |
|---|---|---|---|---|---|
| 5,557,762 A | 9/1996 | Okuaki et al. | 5,808,883 A | 9/1998 | Hawkes |
| 5,559,502 A | 9/1996 | Schutte | 5,811,987 A | 9/1998 | Ashmore, Jr. et al. |
| 5,559,996 A | 9/1996 | Fujioka | 5,812,698 A | 9/1998 | Platt et al. |
| 5,563,529 A | 10/1996 | Seltzer et al. | 5,818,254 A | 10/1998 | Agrawal et al. |
| 5,564,010 A | 10/1996 | Henry et al. | 5,838,583 A | 11/1998 | Varadarajan et al. |
| 5,564,108 A | 10/1996 | Hunsaker et al. | 5,841,078 A | 11/1998 | Miller et al. |
| 5,565,658 A | 10/1996 | Gerpheide et al. | 5,841,996 A | 11/1998 | Nolan et al. |
| 5,566,702 A | 10/1996 | Philipp | 5,844,265 A | 12/1998 | Mead et al. |
| 5,572,665 A | 11/1996 | Nakabayashi | 5,844,404 A | 12/1998 | Caser et al. |
| 5,572,719 A | 11/1996 | Biesterfeldt | 5,848,285 A | 12/1998 | Kapusta et al. |
| 5,574,678 A | 11/1996 | Gorecki | 5,850,156 A | 12/1998 | Wittman |
| 5,574,852 A | 11/1996 | Bakker et al. | 5,852,733 A | 12/1998 | Chien et al. |
| 5,574,892 A | 11/1996 | Christensen | 5,854,625 A | 12/1998 | Frisch et al. |
| 5,579,353 A | 11/1996 | Parmenter et al. | 5,857,109 A | 1/1999 | Taylor |
| 5,587,945 A | 12/1996 | Lin et al. | 5,861,583 A | 1/1999 | Schediwy et al. |
| 5,587,957 A | 12/1996 | Kowalczyk et al. | 5,861,875 A | 1/1999 | Gerpheide |
| 5,590,354 A | 12/1996 | Klapproth et al. | 5,864,242 A | 1/1999 | Allen et al. |
| 5,594,734 A | 1/1997 | Worsley et al. | 5,864,392 A | 1/1999 | Winklhofer et al. |
| 5,594,876 A | 1/1997 | Getzlaff et al. | 5,867,015 A | 2/1999 | Corsi et al. |
| 5,594,890 A | 1/1997 | Yamaura et al. | 5,867,399 A | 2/1999 | Rostoker et al. |
| 5,604,466 A | 2/1997 | Dreps et al. | 5,870,004 A | 2/1999 | Lu |
| 5,608,892 A | 3/1997 | Wakerly | 5,870,309 A | 2/1999 | Lawman |
| 5,614,861 A | 3/1997 | Harada | 5,870,345 A | 2/1999 | Stecker |
| 5,629,891 A | 5/1997 | Lemoncheck et al. | 5,872,464 A | 2/1999 | Gradinariu |
| 5,630,052 A | 5/1997 | Shah | 5,874,958 A | 2/1999 | Ludolph |
| 5,630,057 A | 5/1997 | Hait | 5,875,293 A | 2/1999 | Bell et al. |
| 5,630,102 A | 5/1997 | Johnson et al. | 5,878,425 A | 3/1999 | Redpath |
| 5,631,577 A | 5/1997 | Freidin et al. | 5,880,411 A | 3/1999 | Gillespie et al. |
| 5,642,295 A | 6/1997 | Smayling | 5,883,623 A | 3/1999 | Cseri |
| 5,646,901 A | 7/1997 | Sharpe-Geisler et al. | 5,886,582 A | 3/1999 | Stansell |
| 5,648,642 A | 7/1997 | Miller et al. | 5,889,236 A | 3/1999 | Gillespie et al. |
| 5,651,035 A | 7/1997 | Tozun et al. | 5,889,723 A | 3/1999 | Pascucci |
| 5,663,900 A | 9/1997 | Bhandari et al. | 5,889,936 A | 3/1999 | Chan |
| 5,663,965 A | 9/1997 | Seymour | 5,889,988 A | 3/1999 | Held |
| 5,664,199 A | 9/1997 | Kuwahara | 5,894,226 A | 4/1999 | Koyama |
| 5,666,480 A | 9/1997 | Leung et al. | 5,894,243 A | 4/1999 | Hwang |
| 5,670,915 A | 9/1997 | Cooper et al. | 5,895,494 A | 4/1999 | Scalzi et al. |
| 5,673,198 A | 9/1997 | Lawman et al. | 5,898,345 A | 4/1999 | Namura et al. |
| 5,675,825 A | 10/1997 | Dreyer et al. | 5,900,780 A | 5/1999 | Hirose et al. |
| 5,677,691 A | 10/1997 | Hosticka et al. | 5,901,062 A | 5/1999 | Burch et al. |
| 5,682,032 A | 10/1997 | Philipp | 5,903,718 A | 5/1999 | Marik |
| 5,684,434 A | 11/1997 | Mann et al. | 5,905,398 A | 5/1999 | Todsen et al. |
| 5,684,952 A | 11/1997 | Stein | 5,911,059 A | 6/1999 | Profit, Jr. |
| 5,689,195 A | 11/1997 | Cliff et al. | 5,914,465 A | 6/1999 | Allen et al. |
| 5,689,196 A | 11/1997 | Schutte | 5,914,708 A | 6/1999 | Lagrange et al. |
| 5,691,898 A | 11/1997 | Rosenberg et al. | 5,917,356 A | 6/1999 | Casal et al. |
| 5,694,063 A | 12/1997 | Burlison et al. | 5,920,310 A | 7/1999 | Faggin et al. |
| 5,696,952 A | 12/1997 | Pontarelli | 5,923,264 A | 7/1999 | Lavelle et al. |
| 5,699,024 A | 12/1997 | Manlove et al. | 5,926,566 A | 7/1999 | Wang et al. |
| 5,708,589 A | 1/1998 | Beauvais | 5,930,150 A | 7/1999 | Cohen et al. |
| 5,708,798 A | 1/1998 | Lynch et al. | 5,933,023 A | 8/1999 | Young |
| 5,710,906 A | 1/1998 | Ghosh et al. | 5,933,356 A | 8/1999 | Rostoker et al. |
| 5,712,969 A | 1/1998 | Zimmermann et al. | 5,933,816 A | 8/1999 | Zeanah et al. |
| 5,724,009 A | 3/1998 | Collins et al. | 5,935,233 A | 8/1999 | Jeddeloh |
| 5,727,170 A | 3/1998 | Mitchell et al. | 5,935,266 A | 8/1999 | Thurnhofer et al. |
| 5,729,704 A | 3/1998 | Stone et al. | 5,941,991 A | 8/1999 | Kageshima |
| 5,730,165 A | 3/1998 | Philipp | 5,942,733 A | 8/1999 | Allen et al. |
| 5,734,272 A | 3/1998 | Belot et al. | 5,943,052 A | 8/1999 | Allen et al. |
| 5,734,334 A | 3/1998 | Hsieh et al. | 5,949,632 A | 9/1999 | Barreras, Sr. et al. |
| 5,737,760 A | 4/1998 | Grimmer et al. | 5,952,888 A | 9/1999 | Scott |
| 5,745,011 A | 4/1998 | Scott | 5,956,279 A | 9/1999 | Mo et al. |
| 5,752,013 A | 5/1998 | Christensen et al. | 5,963,075 A | 10/1999 | Hiiragizawa |
| 5,754,552 A | 5/1998 | Allmond et al. | 5,964,893 A | 10/1999 | Circello et al. |
| 5,757,368 A | 5/1998 | Gerpheide et al. | 5,966,027 A | 10/1999 | Kapusta et al. |
| 5,758,058 A | 5/1998 | Milburn | 5,968,135 A | 10/1999 | Teramoto et al. |
| 5,763,909 A | 6/1998 | Mead et al. | 5,969,513 A | 10/1999 | Clark |
| 5,767,457 A | 6/1998 | Gerpheide et al. | 5,969,632 A | 10/1999 | Diamant et al. |
| 5,774,704 A | 6/1998 | Williams | 5,973,368 A | 10/1999 | Pearce et al. |
| 5,777,399 A | 7/1998 | Shibuya | 5,974,235 A | 10/1999 | Nunally et al. |
| 5,781,030 A | 7/1998 | Agrawal et al. | 5,977,791 A | 11/1999 | Veenstra |
| 5,781,747 A | 7/1998 | Smith et al. | 5,978,584 A | 11/1999 | Nishibata et al. |
| 5,784,545 A | 7/1998 | Anderson et al. | 5,978,937 A | 11/1999 | Miyamori et al. |
| 5,790,957 A | 8/1998 | Heidari | 5,982,105 A | 11/1999 | Masters |
| 5,796,183 A | 8/1998 | Hourmand et al. | 5,982,229 A | 11/1999 | Wong et al. |
| 5,799,176 A | 8/1998 | Kapusta et al. | 5,983,277 A | 11/1999 | Heile et al. |
| 5,802,073 A | 9/1998 | Platt | 5,986,479 A | 11/1999 | Mohan |
| 5,802,290 A | 9/1998 | Casselman | 5,994,939 A | 11/1999 | Johnson et al. |
| 5,805,792 A | 9/1998 | Swoboda et al. | 5,996,032 A | 11/1999 | Baker |
| 5,805,897 A | 9/1998 | Glowny | 5,999,725 A | 12/1999 | Barbier et al. |

| | | | | | | |
|---|---|---|---|---|---|---|
| 6,002,268 | A | 12/1999 | Sasaki et al. | 6,211,715 B1 | 4/2001 | Terauchi |
| 6,002,398 | A | 12/1999 | Wilson | 6,211,741 B1 | 4/2001 | Dalmia |
| 6,003,107 | A | 12/1999 | Ranson et al. | 6,215,352 B1 | 4/2001 | Sudo |
| 6,003,133 | A | 12/1999 | Moughanni et al. | 6,219,729 B1 | 4/2001 | Keats et al. |
| 6,005,814 | A | 12/1999 | Mulholland et al. | 6,222,528 B1 | 4/2001 | Gerpheide et al. |
| 6,009,270 | A | 12/1999 | Mann | 6,223,144 B1 | 4/2001 | Barnett et al. |
| 6,009,496 | A | 12/1999 | Tsai | 6,223,147 B1 | 4/2001 | Bowers |
| 6,011,407 | A | 1/2000 | New | 6,223,272 B1 | 4/2001 | Coehlo et al. |
| 6,014,723 | A | 1/2000 | Tremblay et al. | RE37,195 E | 5/2001 | Kean |
| 6,016,554 | A | 1/2000 | Skrovan et al. | 6,225,992 B1 | 5/2001 | Hsu et al. |
| 6,016,563 | A | 1/2000 | Fleisher | 6,236,593 B1 | 5/2001 | Hong et al. |
| 6,023,422 | A | 2/2000 | Allen et al. | 6,239,389 B1 | 5/2001 | Allen et al. |
| 6,026,501 | A | 2/2000 | Hohl et al. | 6,239,798 B1 | 5/2001 | Ludolph et al. |
| 6,028,271 | A | 2/2000 | Gillespie et al. | 6,240,375 B1 | 5/2001 | Sonoda |
| 6,028,959 | A | 2/2000 | Wang et al. | 6,246,258 B1 | 6/2001 | Lesea |
| 6,031,365 | A | 2/2000 | Sharpe-Geisler | 6,246,410 B1 | 6/2001 | Bergeron et al. |
| 6,032,268 | A | 2/2000 | Swoboda et al. | 6,249,167 B1 | 6/2001 | Oguchi et al. |
| 6,034,538 | A | 3/2000 | Abramovici | 6,249,447 B1 | 6/2001 | Boylan et al. |
| 6,038,551 | A | 3/2000 | Barlow et al. | 6,253,250 B1 | 6/2001 | Evans et al. |
| 6,040,707 | A | 3/2000 | Young et al. | 6,262,717 B1 | 7/2001 | Donohue et al. |
| 6,041,406 | A | 3/2000 | Mann | 6,263,302 B1 | 7/2001 | Hellestrand et al. |
| 6,049,223 | A | 4/2000 | Lytle et al. | 6,263,339 B1 | 7/2001 | Hirsch |
| 6,049,225 | A | 4/2000 | Huang et al. | 6,263,484 B1 | 7/2001 | Yang |
| 6,051,772 | A | 4/2000 | Cameron et al. | 6,269,383 B1 | 7/2001 | Sabin et al. |
| 6,055,584 | A | 4/2000 | Bridges et al. | 6,271,679 B1 | 8/2001 | McClintock et al. |
| 6,058,263 | A | 5/2000 | Voth | 6,272,646 B1 | 8/2001 | Rangasayee et al. |
| 6,058,452 | A | 5/2000 | Rangasayee et al. | 6,278,568 B1 | 8/2001 | Cloke et al. |
| 6,061,511 | A | 5/2000 | Marantz et al. | 6,280,391 B1 | 8/2001 | Olson et al. |
| 6,066,961 | A | 5/2000 | Lee et al. | 6,282,547 B1 | 8/2001 | Hirsch |
| 6,070,003 | A | 5/2000 | Gove et al. | 6,282,551 B1 | 8/2001 | Anderson et al. |
| 6,072,803 | A | 6/2000 | Allmond et al. | 6,286,127 B1 | 9/2001 | King et al. |
| 6,075,941 | A | 6/2000 | Itoh et al. | 6,288,707 B1 | 9/2001 | Philipp |
| 6,079,985 | A | 6/2000 | Wohl et al. | 6,289,300 B1 | 9/2001 | Brannick et al. |
| 6,081,140 | A | 6/2000 | King | 6,289,489 B1 | 9/2001 | Bold et al. |
| 6,094,730 | A | 7/2000 | Lopez et al. | 6,294,962 B1 | 9/2001 | Mar |
| 6,097,211 | A | 8/2000 | Couts-Martin et al. | 6,298,320 B1 | 10/2001 | Buckmaster et al. |
| 6,097,432 | A | 8/2000 | Mead et al. | 6,304,014 B1 | 10/2001 | England et al. |
| 6,101,457 | A | 8/2000 | Barch et al. | 6,304,790 B1 | 10/2001 | Nakamura et al. |
| 6,104,217 | A | 8/2000 | Magana | 6,310,611 B1 | 10/2001 | Caldwell |
| 6,104,325 | A | 8/2000 | Liaw et al. | 6,314,530 B1 | 11/2001 | Mann |
| 6,107,769 | A | 8/2000 | Saylor et al. | 6,320,184 B1 | 11/2001 | Winklhofer et al. |
| 6,107,826 | A | 8/2000 | Young et al. | 6,320,282 B1 | 11/2001 | Caldwell |
| 6,112,264 | A | 8/2000 | Beasley et al. | 6,323,846 B1 | 11/2001 | Westerman et al. |
| 6,121,805 | A | 9/2000 | Thamsirianunt et al. | 6,324,628 B1 | 11/2001 | Chan |
| 6,125,416 | A | 9/2000 | Warren | 6,326,859 B1 | 12/2001 | Goldman et al. |
| 6,130,551 | A | 10/2000 | Agrawal et al. | 6,332,201 B1 | 12/2001 | Chin et al. |
| 6,130,552 | A | 10/2000 | Jefferson et al. | 6,337,579 B1 | 1/2002 | Mochida |
| 6,134,181 | A | 10/2000 | Landry | 6,338,109 B1 | 1/2002 | Snyder et al. |
| 6,134,516 | A | 10/2000 | Wang et al. | 6,339,815 B1 | 1/2002 | Feng et al. |
| 6,137,308 | A | 10/2000 | Nayak | 6,345,383 B1 | 2/2002 | Ueki |
| 6,140,853 | A | 10/2000 | Lo | 6,347,395 B1 | 2/2002 | Payne et al. |
| 6,141,007 | A * | 10/2000 | Lebling et al. ............ 715/792 | 6,351,789 B1 | 2/2002 | Green |
| 6,141,376 | A | 10/2000 | Shaw | 6,353,452 B1 | 3/2002 | Hamada et al. |
| 6,141,764 | A | 10/2000 | Ezell | 6,355,980 B1 | 3/2002 | Callahan |
| 6,148,104 | A | 11/2000 | Wang et al. | 6,356,862 B2 | 3/2002 | Bailey |
| 6,148,441 | A | 11/2000 | Woodward | 6,356,958 B1 | 3/2002 | Lin |
| 6,150,866 | A | 11/2000 | Eto et al. | 6,356,960 B1 | 3/2002 | Jones et al. |
| 6,161,199 | A | 12/2000 | Szeto et al. | 6,366,300 B1 | 4/2002 | Ohara et al. |
| 6,166,960 | A | 12/2000 | Marneweck et al. | 6,366,874 B1 | 4/2002 | Lee et al. |
| 6,167,559 | A | 12/2000 | Furtek et al. | 6,366,878 B1 | 4/2002 | Grunert |
| 6,172,571 | B1 | 1/2001 | Moyal et al. | 6,369,660 B1 | 4/2002 | Wei et al. |
| 6,173,419 | B1 | 1/2001 | Barnett | 6,371,878 B1 | 4/2002 | Bowen |
| 6,175,914 | B1 | 1/2001 | Mann | 6,373,954 B1 | 4/2002 | Malcolm, Jr. et al. |
| 6,181,163 | B1 | 1/2001 | Agrawal et al. | 6,374,370 B1 | 4/2002 | Bockhaus et al. |
| 6,185,127 | B1 | 2/2001 | Myers et al. | 6,377,009 B1 | 4/2002 | Philipp |
| 6,185,522 | B1 | 2/2001 | Bakker | 6,377,646 B1 | 4/2002 | Sha |
| 6,185,703 | B1 | 2/2001 | Guddat et al. | 6,380,929 B1 | 4/2002 | Platt |
| 6,185,732 | B1 | 2/2001 | Mann et al. | 6,380,931 B1 | 4/2002 | Gillespie et al. |
| 6,188,228 | B1 | 2/2001 | Philipp | 6,384,947 B1 | 5/2002 | Ackerman et al. |
| 6,188,241 | B1 | 2/2001 | Gauthier et al. | 6,385,742 B1 | 5/2002 | Kirsch et al. |
| 6,188,391 | B1 | 2/2001 | Seely et al. | 6,388,109 B1 | 5/2002 | Schwarz et al. |
| 6,188,975 | B1 | 2/2001 | Gay | 6,388,464 B1 | 5/2002 | Lacey et al. |
| 6,191,603 | B1 | 2/2001 | Muradali et al. | 6,396,302 B2 | 5/2002 | New et al. |
| 6,191,998 | B1 | 2/2001 | Reddy et al. | 6,408,432 B1 | 6/2002 | Herrmann et al. |
| 6,192,431 | B1 | 2/2001 | Dabral et al. | 6,411,974 B1 | 6/2002 | Graham et al. |
| 6,201,407 | B1 | 3/2001 | Kapusta et al. | 6,414,671 B1 | 7/2002 | Gillespie et al. |
| 6,202,044 | B1 | 3/2001 | Tzori | 6,425,109 B1 | 7/2002 | Choukalos et al. |
| 6,204,687 | B1 | 3/2001 | Schultz et al. | 6,430,305 B1 | 8/2002 | Decker |
| 6,211,708 | B1 | 4/2001 | Klemmer | 6,434,187 B1 | 8/2002 | Beard et al. |

| Patent | Date | Inventor |
|---|---|---|
| 6,438,565 B1 | 8/2002 | Ammirato et al. |
| 6,438,738 B1 | 8/2002 | Elayda |
| 6,441,073 B1 | 8/2002 | Tanaka et al. |
| 6,445,211 B1 | 9/2002 | Saripella |
| 6,449,755 B1 | 9/2002 | Beausang et al. |
| 6,452,437 B1 | 9/2002 | Takeuchi et al. |
| 6,452,514 B1 | 9/2002 | Philipp |
| 6,453,175 B2 | 9/2002 | Mizell et al. |
| 6,453,461 B1 | 9/2002 | Chaiken |
| 6,456,304 B1 | 9/2002 | Angiulo et al. |
| 6,457,355 B1 | 10/2002 | Philipp |
| 6,457,479 B1 | 10/2002 | Zhuang et al. |
| 6,463,488 B1 | 10/2002 | San Juan |
| 6,466,036 B1 | 10/2002 | Philipp |
| 6,466,898 B1 | 10/2002 | Chan |
| 6,473,069 B1 | 10/2002 | Gerpheide |
| 6,473,825 B1 | 10/2002 | Worley et al. |
| 6,477,691 B1 | 11/2002 | Bergamashi et al. |
| 6,480,921 B1 | 11/2002 | Mansoorian et al. |
| 6,487,700 B1 | 11/2002 | Fukushima |
| 6,489,899 B1 | 12/2002 | Ely et al. |
| 6,490,213 B1 | 12/2002 | Mu et al. |
| 6,496,971 B1 | 12/2002 | Lesea et al. |
| 6,498,720 B2 | 12/2002 | Glad |
| 6,499,134 B1 | 12/2002 | Buffet et al. |
| 6,499,359 B1 | 12/2002 | Washeleski et al. |
| 6,507,214 B1 | 1/2003 | Snyder |
| 6,507,215 B1 | 1/2003 | Piasecki et al. |
| 6,509,758 B2 | 1/2003 | Piasecki et al. |
| 6,512,395 B1 | 1/2003 | Lacey et al. |
| 6,516,428 B2 | 2/2003 | Wenzel et al. |
| 6,522,128 B1 | 2/2003 | Ely et al. |
| 6,523,416 B2 | 2/2003 | Takagi et al. |
| 6,525,593 B1 | 2/2003 | Mar |
| 6,529,791 B1 | 3/2003 | Takagi |
| 6,534,970 B1 | 3/2003 | Ely et al. |
| 6,535,200 B2 | 3/2003 | Philipp |
| 6,535,946 B1 | 3/2003 | Bryant et al. |
| 6,536,028 B1 | 3/2003 | Katsioulas et al. |
| 6,542,025 B1 | 4/2003 | Kutz et al. |
| 6,552,933 B2 | 4/2003 | Roohparvar |
| 6,553,057 B1 | 4/2003 | Sha et al. |
| 6,557,164 B1 | 4/2003 | Faustini |
| 6,560,306 B1 | 5/2003 | Duffy et al. |
| 6,564,179 B1 | 5/2003 | Belhaj |
| 6,567,426 B1 | 5/2003 | van Hook et al. |
| 6,567,932 B2 | 5/2003 | Edwards et al. |
| 6,570,557 B1 | 5/2003 | Westerman et al. |
| 6,571,331 B2 | 5/2003 | Henry et al. |
| 6,574,590 B1 | 6/2003 | Kershaw et al. |
| 6,574,739 B1 | 6/2003 | Kung et al. |
| 6,575,373 B1 | 6/2003 | Nakano |
| 6,581,191 B1 | 6/2003 | Schubert et al. |
| 6,587,093 B1 | 7/2003 | Shaw et al. |
| 6,587,995 B1 | 7/2003 | Duboc et al. |
| 6,591,369 B1 | 7/2003 | Edwards et al. |
| 6,592,626 B1 | 7/2003 | Bauchot et al. |
| 6,594,796 B1 | 7/2003 | Chiang |
| 6,594,799 B1 | 7/2003 | Robertson et al. |
| 6,597,824 B2 | 7/2003 | Newberg et al. |
| 6,598,178 B1 | 7/2003 | Yee et al. |
| 6,600,575 B1 | 7/2003 | Kohara |
| 6,601,189 B1 | 7/2003 | Edwards et al. |
| 6,601,236 B1 | 7/2003 | Curtis |
| 6,603,330 B1 | 8/2003 | Snyder |
| 6,603,348 B1 | 8/2003 | Preuss et al. |
| 6,604,179 B2 | 8/2003 | Volk et al. |
| 6,608,472 B1 | 8/2003 | Kutz et al. |
| 6,610,936 B2 | 8/2003 | Gillespie et al. |
| 6,611,220 B1 | 8/2003 | Snyder |
| 6,611,276 B1 | 8/2003 | Muratori et al. |
| 6,611,856 B1 | 8/2003 | Liao et al. |
| 6,611,952 B1 | 8/2003 | Prakash et al. |
| 6,613,098 B1 | 9/2003 | Sorge et al. |
| 6,614,260 B1 | 9/2003 | Welch et al. |
| 6,618,854 B1 | 9/2003 | Mann |
| 6,624,640 B2 | 9/2003 | Lund et al. |
| 6,631,508 B1 | 10/2003 | Williams |
| 6,639,586 B2 | 10/2003 | Gerpheide |
| 6,642,857 B1 | 11/2003 | Schediwy et al. |
| 6,643,151 B1 | 11/2003 | Nebrigic et al. |
| 6,643,810 B2 | 11/2003 | Whetsel |
| 6,649,924 B1 | 11/2003 | Philipp et al. |
| 6,658,498 B1 | 12/2003 | Carney et al. |
| 6,658,633 B2 | 12/2003 | Devins et al. |
| 6,661,288 B2 | 12/2003 | Morgan et al. |
| 6,661,410 B2 | 12/2003 | Casebolt et al. |
| 6,664,978 B1 | 12/2003 | Kekic et al. |
| 6,667,642 B1 | 12/2003 | Moyal |
| 6,667,740 B2 | 12/2003 | Ely et al. |
| 6,673,308 B2 | 1/2004 | Hino et al. |
| 6,677,932 B1 | 1/2004 | Westerman |
| 6,678,645 B1 | 1/2004 | Rajsuman et al. |
| 6,678,877 B1 | 1/2004 | Perry et al. |
| 6,680,731 B2 | 1/2004 | Gerpheide et al. |
| 6,681,280 B1 | 1/2004 | Miyake et al. |
| 6,681,359 B1 | 1/2004 | Au et al. |
| 6,683,462 B2 | 1/2004 | Shimizu |
| 6,691,193 B1 | 2/2004 | Wang et al. |
| 6,691,301 B2 | 2/2004 | Bowen |
| 6,701,340 B1 | 3/2004 | Gorecki et al. |
| 6,704,879 B1 | 3/2004 | Parrish |
| 6,704,889 B2 | 3/2004 | Veenstra et al. |
| 6,705,511 B1 | 3/2004 | Dames et al. |
| 6,710,788 B1 | 3/2004 | Freach et al. |
| 6,711,731 B2 | 3/2004 | Weiss |
| 6,713,897 B2 | 3/2004 | Caldwell |
| 6,714,066 B2 | 3/2004 | Gorecki et al. |
| 6,714,817 B2 | 3/2004 | Daynes et al. |
| 6,715,132 B1 | 3/2004 | Bartz et al. |
| 6,718,294 B1 | 4/2004 | Bortfeld |
| 6,718,533 B1 | 4/2004 | Schneider et al. |
| 6,728,900 B1 | 4/2004 | Meli |
| 6,728,902 B2 | 4/2004 | Kaiser et al. |
| 6,730,863 B1 | 5/2004 | Gerpheide et al. |
| 6,732,068 B2 | 5/2004 | Sample et al. |
| 6,738,858 B1 | 5/2004 | Fernald et al. |
| 6,750,852 B2 | 6/2004 | Gillespie et al. |
| 6,750,889 B1 | 6/2004 | Livingston |
| 6,754,101 B2 | 6/2004 | Terzioglu et al. |
| 6,754,765 B1 | 6/2004 | Chang et al. |
| 6,754,849 B2 | 6/2004 | Tamura |
| 6,757,882 B1 | 6/2004 | Chen et al. |
| 6,765,407 B1 | 7/2004 | Snyder |
| 6,768,337 B2 | 7/2004 | Kohno et al. |
| 6,769,622 B1 | 8/2004 | Tournemille et al. |
| 6,771,552 B2 | 8/2004 | Fujisawa |
| 6,784,821 B1 | 8/2004 | Lee |
| 6,785,881 B1 | 8/2004 | Bartz et al. |
| 6,788,221 B1 | 9/2004 | Ely et al. |
| 6,798,218 B2 | 9/2004 | Kasperkovitz |
| 6,798,299 B1 | 9/2004 | Mar et al. |
| 6,799,198 B1 | 9/2004 | Huboi et al. |
| 6,807,109 B2 | 10/2004 | Tomishima |
| 6,809,275 B1 | 10/2004 | Cheng et al. |
| 6,810,442 B1 | 10/2004 | Lin et al. |
| 6,812,678 B1 | 11/2004 | Brohlin |
| 6,816,544 B1 | 11/2004 | Bailey et al. |
| 6,823,282 B1 | 11/2004 | Snyder |
| 6,823,497 B2 | 11/2004 | Schubert et al. |
| 6,825,689 B1 | 11/2004 | Snyder |
| 6,825,869 B2 | 11/2004 | Bang |
| 6,828,824 B2 | 12/2004 | Betz et al. |
| 6,829,727 B1 | 12/2004 | Pawloski |
| 6,834,384 B2 | 12/2004 | Fiorella, II et al. |
| 6,839,774 B1 | 1/2005 | Ahn et al. |
| 6,847,203 B1 | 1/2005 | Conti et al. |
| 6,850,117 B2 | 2/2005 | Weber et al. |
| 6,850,554 B1 | 2/2005 | Sha et al. |
| 6,853,598 B2 | 2/2005 | Chevallier |
| 6,854,067 B1 | 2/2005 | Kutz et al. |
| 6,856,433 B2 | 2/2005 | Hatano et al. |
| 6,859,884 B1 | 2/2005 | Sullam |
| 6,864,710 B1 | 3/2005 | Lacey et al. |
| 6,865,429 B1 | 3/2005 | Schneider et al. |
| 6,865,504 B2 | 3/2005 | Larson et al. |
| 6,868,500 B1 | 3/2005 | Kutz et al. |
| 6,871,253 B2 | 3/2005 | Greeff et al. |

| | | |
|---|---|---|
| 6,873,203 B1 | 3/2005 | Latham, II et al. |
| 6,876,941 B2 | 4/2005 | Nightingale |
| 6,880,086 B2 | 4/2005 | Kidder et al. |
| 6,888,453 B2 | 5/2005 | Lutz et al. |
| 6,888,538 B2 | 5/2005 | Ely et al. |
| 6,892,310 B1 | 5/2005 | Kutz et al. |
| 6,892,322 B1 | 5/2005 | Snyder |
| 6,893,724 B2 | 5/2005 | Lin et al. |
| 6,897,390 B2 | 5/2005 | Caldwell et al. |
| 6,901,563 B1 | 5/2005 | Ogami et al. |
| 6,910,126 B1 | 6/2005 | Mar et al. |
| 6,922,821 B1 | 7/2005 | Nemecek |
| 6,934,674 B1 | 8/2005 | Douezy et al. |
| 6,941,538 B2 | 9/2005 | Hwang et al. |
| 6,944,018 B2 | 9/2005 | Caldwell |
| 6,950,954 B1 | 9/2005 | Sullam et al. |
| 6,950,990 B2 | 9/2005 | Rajarajan et al. |
| 6,952,778 B1 | 10/2005 | Snyder |
| 6,957,180 B1 | 10/2005 | Nemecek |
| 6,957,242 B1 | 10/2005 | Snyder |
| 6,967,511 B1 | 11/2005 | Sullam |
| 6,967,960 B1 | 11/2005 | Bross et al. |
| 6,970,844 B1 | 11/2005 | Bierenbaum |
| 6,981,090 B1 | 12/2005 | Kutz et al. |
| 6,988,192 B2 | 1/2006 | Snider |
| 6,989,659 B2 | 1/2006 | Menegoli et al. |
| 6,996,799 B1 | 2/2006 | Cismas et al. |
| 7,005,933 B1 | 2/2006 | Shutt |
| 7,017,145 B2 | 3/2006 | Taylor |
| 7,020,854 B2 | 3/2006 | Killian et al. |
| 7,023,257 B1 | 4/2006 | Sullam |
| 7,024,636 B2 | 4/2006 | Weed |
| 7,024,654 B2 | 4/2006 | Bersch et al. |
| 7,034,603 B2 | 4/2006 | Brady et al. |
| 7,055,035 B2 | 5/2006 | Allison et al. |
| 7,058,921 B1 | 6/2006 | Hwang et al. |
| 7,073,158 B2 | 7/2006 | McCubbrey |
| 7,076,420 B1 | 7/2006 | Snyder et al. |
| 7,086,014 B1 | 8/2006 | Bartz et al. |
| 7,089,175 B1 | 8/2006 | Nemecek et al. |
| 7,092,980 B1 | 8/2006 | Mar et al. |
| 7,099,818 B1 | 8/2006 | Nemecek et al. |
| 7,103,108 B1 | 9/2006 | Beard |
| 7,117,485 B2 | 10/2006 | Wilkinson et al. |
| 7,119,550 B2 | 10/2006 | Kitano et al. |
| 7,124,376 B2 | 10/2006 | Zaidi et al. |
| 7,127,630 B1 | 10/2006 | Snyder |
| 7,138,841 B1 | 11/2006 | Li et al. |
| 7,149,316 B1 | 12/2006 | Kutz et al. |
| 7,150,002 B1 | 12/2006 | Anderson et al. |
| 7,152,027 B2 | 12/2006 | Andreade et al. |
| 7,161,936 B1 | 1/2007 | Barrass et al. |
| 7,162,410 B1 | 1/2007 | Nemecek et al. |
| 7,171,455 B1 | 1/2007 | Gupta et al. |
| 7,180,342 B1 | 2/2007 | Shutt et al. |
| 7,185,162 B1 | 2/2007 | Snyder |
| 7,185,321 B1 | 2/2007 | Roe et al. |
| 7,188,063 B1 | 3/2007 | Snyder |
| 7,193,901 B2 | 3/2007 | Ruby et al. |
| 7,206,733 B1 | 4/2007 | Nemecek |
| 7,221,187 B1 | 5/2007 | Snyder et al. |
| 7,236,921 B1 | 6/2007 | Nemecek et al. |
| 7,256,588 B2 | 8/2007 | Howard et al. |
| 7,266,768 B2 | 9/2007 | Ferlitsch et al. |
| 7,282,905 B2 | 10/2007 | Chen et al. |
| 7,283,151 B2 | 10/2007 | Nihei et al. |
| 7,290,244 B2 | 10/2007 | Peck et al. |
| 7,295,049 B1 | 11/2007 | Moyal et al. |
| 7,305,510 B2 | 12/2007 | Miller |
| 7,307,485 B1 | 12/2007 | Snyder et al. |
| 7,312,616 B2 | 12/2007 | Snyder |
| 7,319,999 B1 | 1/2008 | Evans |
| 7,323,879 B2 | 1/2008 | Kuo et al. |
| 7,332,976 B1 | 2/2008 | Brennan |
| 7,342,405 B2 | 3/2008 | Eldridge et al. |
| 7,348,861 B1 | 3/2008 | Wu et al. |
| 7,367,017 B2 | 4/2008 | Maddocks et al. |
| 7,373,437 B2 | 5/2008 | Seigneret et al. |
| 7,376,904 B2 | 5/2008 | Cifra et al. |
| 7,386,740 B2 | 6/2008 | Kutz et al. |
| 7,391,204 B2 | 6/2008 | Bicking |
| 7,397,226 B1 | 7/2008 | Mannama et al. |
| 7,406,674 B1 | 7/2008 | Ogami et al. |
| 7,612,527 B2 | 11/2009 | Hoffman et al. |
| 7,616,509 B2 | 11/2009 | Qureshi et al. |
| 8,085,020 B1 | 12/2011 | Bennett |
| 8,164,365 B2 | 4/2012 | Wright et al. |
| 2001/0010083 A1 | 7/2001 | Satoh |
| 2001/0021985 A1 | 9/2001 | Aldridge et al. |
| 2002/0016706 A1 | 2/2002 | Cooke et al. |
| 2002/0035618 A1* | 3/2002 | Mendez et al. ............... 709/219 |
| 2002/0052729 A1 | 5/2002 | Kyung et al. |
| 2002/0052941 A1 | 5/2002 | Patterson |
| 2002/0059543 A1 | 5/2002 | Cheng et al. |
| 2002/0065646 A1 | 5/2002 | Waldie et al. |
| 2002/0116168 A1 | 8/2002 | Kim |
| 2002/0121679 A1 | 9/2002 | Bazarjani et al. |
| 2002/0122060 A1 | 9/2002 | Markel |
| 2002/0129334 A1 | 9/2002 | Dane et al. |
| 2002/0133771 A1 | 9/2002 | Barnett |
| 2002/0133794 A1 | 9/2002 | Kanapathippillai et al. |
| 2002/0156885 A1 | 10/2002 | Thakkar |
| 2002/0156998 A1 | 10/2002 | Casselman |
| 2002/0170050 A1 | 11/2002 | Fiorella, III et al. |
| 2002/0174134 A1 | 11/2002 | Goykhman |
| 2002/0183956 A1 | 12/2002 | Nightingale |
| 2003/0038842 A1 | 2/2003 | Peck et al. |
| 2003/0041235 A1 | 2/2003 | Meyer |
| 2003/0046657 A1 | 3/2003 | White |
| 2003/0056071 A1 | 3/2003 | Triece et al. |
| 2003/0088852 A1 | 5/2003 | Lacas et al. |
| 2003/0097640 A1 | 5/2003 | Abrams et al. |
| 2003/0105620 A1 | 6/2003 | Bowen |
| 2003/0149961 A1 | 8/2003 | Kawai et al. |
| 2003/0229482 A1 | 12/2003 | Cook et al. |
| 2003/0233631 A1 | 12/2003 | Curry et al. |
| 2004/0054821 A1 | 3/2004 | Warren et al. |
| 2004/0145551 A1 | 7/2004 | Tobita |
| 2004/0153802 A1 | 8/2004 | Kudo et al. |
| 2004/0201627 A1 | 10/2004 | Maddocks et al. |
| 2004/0205695 A1 | 10/2004 | Fletcher |
| 2004/0217799 A1 | 11/2004 | Ichihara |
| 2004/0250231 A1 | 12/2004 | Killian et al. |
| 2005/0057482 A1 | 3/2005 | Youngblood et al. |
| 2005/0066152 A1 | 3/2005 | Garey |
| 2005/0140659 A1 | 6/2005 | Hohl et al. |
| 2005/0240917 A1 | 10/2005 | Wu |
| 2005/0248534 A1 | 11/2005 | Kehlstadt |
| 2006/0150149 A1 | 7/2006 | Chandhoke et al. |
| 2007/0139074 A1 | 6/2007 | Reblewski |
| 2007/0139338 A1 | 6/2007 | Lin et al. |
| 2007/0258458 A1 | 11/2007 | Kapoor |
| 2008/0131145 A1 | 6/2008 | Tao et al. |
| 2008/0186052 A1 | 8/2008 | Needham et al. |
| 2008/0259017 A1 | 10/2008 | Wright et al. |
| 2008/0294806 A1 | 11/2008 | Swindle et al. |
| 2009/0054129 A1 | 2/2009 | Yoshimura et al. |
| 2009/0066427 A1 | 3/2009 | Brennan |
| 2009/0322305 A1 | 12/2009 | De Cremoux |
| 2011/0234264 A1 | 9/2011 | Wright et al. |
| 2011/0248692 A1 | 10/2011 | Shehu et al. |

FOREIGN PATENT DOCUMENTS

| | | |
|---|---|---|
| EP | 1191423 A | 3/2002 |
| JP | 4083405 A | 3/1992 |
| JP | 4095408 A | 3/1992 |
| JP | 5041651 A | 2/1993 |
| JP | 5055842 A | 3/1993 |
| JP | 6021732 A | 1/1994 |
| WO | 9617305 A1 | 6/1996 |
| WO | 9834376 A1 | 8/1998 |
| WO | 9909712 A1 | 2/1999 |

OTHER PUBLICATIONS

USPTO Final Rejection for U.S. Appl. No. 11/166,622 dated Mar. 18, 2010; 12 pages.

USPTO Final Rejection for U.S. Appl. No. 11/200,619 dated Jan. 4, 2010; 18 pages.

USPTO Final Rejection for U.S. Appl. No. 11/201,627 dated May 24, 2010; 26 pages.
USPTO Final Rejection for U.S. Appl. No. 11/201,627 dated Jul. 7, 2009; 19 pages.
USPTO Final Rejection for U.S. Appl. No. 11/273,708 dated Jul. 5, 2007; 8 pages.
USPTO Final Rejection for U.S. Appl. No. 11/322,044 dated Oct. 19, 2009; 10 pages.
USPTO Final Rejection for U.S. Appl. No. 11/337,272 dated Feb. 2, 2007; 11 pages.
USPTO Final Rejection for U.S. Appl. No. 11/644,100 dated May 19, 2010; 13 pages.
USPTO Final Rejection for U.S. Appl. No. 11/644,100 dated Aug. 19, 2009; 12 pages.
USPTO Final Rejection for U.S. Appl. No. 11/698,660 dated Feb. 16, 2010; 14 pages.
USPTO Final Rejection for U.S. Appl. No. 11/698,660 dated May 28, 2009; 12 pages.
USPTO Final Rejection for U.S. Appl. No. 11/799,439 dated Dec. 18, 2008; 6 pages.
USPTO Final Rejection for U.S. Appl. No. 11/818,005 dated May 24, 2010; 8 pages.
USPTO Final Rejection for U.S. Appl. No. 11/850,260 dated Aug. 21, 2009; 9 pages.
USPTO Final Rejection for U.S. Appl. No. 11/857,947 dated Oct. 14, 2009; 22 pages.
USPTO Final Rejection for U.S. Appl. No. 11/865,672 dated Dec. 30, 2009; 6 pages.
USPTO Final Rejection for U.S. Appl. No. 11/968,145 dated Aug. 2, 2010; 6 pages.
USPTO Final Rejection for U.S. Appl. No. 11/983,291 dated Aug. 12, 2009; 10 pages.
USPTO Final Rejection for U.S. Appl. No. 12/070,547 dated Oct. 30, 2009; 5 pages.
USPTO Final Rejection for U.S. Appl. No. 10/001,478 dated Feb. 23, 2010; 5 pages.
USPTO Final Rejection for U.S. Appl. No. 10/113,581 dated Jun. 23, 2010; 6 pages.
USPTO Final Rejection for U.S. Appl. No. 10/327,207 dated May 13, 2003; 1 page.
USPTO Miscellaneous Action for U.S. Appl. No. 11/201,922 dated Oct. 1, 2009; 2 pages.
USPTO Miscellaneous Action with SSP for U.S. Appl. No. 09/930,021 dated Oct. 1, 2001; 1 page.
USPTO Non-Final Rejection for U.S. Appl. No. 10/001,477 dated May 11, 2005; 10 pages.
USPTO Non-Final Rejection for U.S. Appl. No. 09/975,105 dated Jan. 19, 2006; 5 pages.
USPTO Non-Final Rejection for U.S. Appl. No. 09/975,105 dated Apr. 19, 2005; 9 pages.
USPTO Non-Final Rejection for U.S. Appl. No. 09/975,115 dated Jan. 7, 2008; 30 pages.
USPTO Non-Final Rejection for U.S. Appl. No. 09/975,115 dated Nov. 11, 2006; 15 pages.
USPTO Non-Final Rejection for U.S. Appl. No. 09/975,115 dated Feb. 11, 2005; 86 pages.
USPTO Non-Final Rejection for U.S. Appl. No. 09/975,115 dated Jul. 27, 2005; 11 pages.
USPTO Non-Final Rejection for U.S. Appl. No. 09/975,115 dated Jul. 31, 2007; 28 pages.
USPTO Non-Final Rejection for U.S. Appl. No. 09/975,115 dated Oct. 9, 2008; 34 pages.
USPTO Non-Final Rejection for U.S. Appl. No. 09/975,115 dated Oct. 31, 2006; 19 pages.
USPTO Non-Final Rejection for U.S. Appl. No. 09/989,765 dated Sep. 19, 2007; 14 pages.
USPTO Non-Final Rejection for U.S. Appl. No. 09/989,765 dated Sep. 26, 2008; 17 pages.
USPTO Non-Final Rejection for U.S. Appl. No. 09/989,765 dated Oct. 2, 2006; 13 pages.
USPTO Non-Final Rejection for U.S. Appl. No. 09/989,765 dated Oct. 5, 2005; 9 pages.
USPTO Non-Final Rejection for U.S. Appl. No. 09/989,767 dated Jul. 2, 2007; 22 pages.
USPTO Non-Final Rejection for U.S. Appl. No. 09/989,767 dated Jul. 17, 2006; 12 pages.
USPTO Non-Final Rejection for U.S. Appl. No. 09/989,767 dated Jul. 24, 2008; 21 pages.
USPTO Non-Final Rejection for U.S. Appl. No. 09/989,771 dated May 28, 2008; 14 pages.
USPTO Non-Final Rejection for U.S. Appl. No. 09/989,771 dated Jul. 16, 2007; 14 pages.
USPTO Non-Final Rejection for U.S. Appl. No. 09/989,771 dated Aug. 23, 2006; 7 pages.
USPTO Non-Final Rejection for U.S. Appl. No. 09/989,771 dated Sep. 12, 2005; 7 pages.
USPTO Non-Final Rejection for U.S. Appl. No. 09/989,771 dated Sep. 22, 2004; 7 pages.
USPTO Non-Final Rejection for U.S. Appl. No. 09/989,777 dated Apr. 11, 2006; 21 pages.
USPTO Non-Final Rejection for U.S. Appl. No. 09/989,777 dated Jul. 5, 2005; 36 pages.
USPTO Non-Final Rejection for U.S. Appl. No. 09/989,777 dated Sep. 11, 2007; 18 pages.
USPTO Non-Final Rejection for U.S. Appl. No. 09/989,777 dated Sep. 13, 2006; 18 pages.
USPTO Non-Final Rejection for U.S. Appl. No. 09/989,778 dated Jul. 14, 2008; 24 pages.
USPTO Non-Final Rejection for U.S. Appl. No. 09/989,778 dated Jul. 19, 2007; 18 pages.
USPTO Non-Final Rejection for U.S. Appl. No. 09/989,778 dated Sep. 1, 2005; 10 pages.
USPTO Non-Final Rejection for U.S. Appl. No. 09/989,778 dated Sep. 18, 2006; 11 pages.
USPTO Non-Final Rejection for U.S. Appl. No. 09/989,782 dated Jan. 29, 2007; 9 pages.
USPTO Non-Final Rejection for U.S. Appl. No. 09/989,782 dated Mar. 28, 2006; 8 pages.
USPTO Non-Final Rejection for U.S. Appl. No. 09/989,782 dated Apr. 29, 2005; 11 pages.
USPTO Non-Final Rejection for U.S. Appl. No. 09/989,782 dated Oct. 6, 2004; 11 pages.
USPTO Non-Final Rejection for U.S. Appl. No. 09/989,782 dated Nov. 26, 2008; 10 pages.
USPTO Non-Final Rejection for U.S. Appl. No. 09/989,782 dated Dec. 14, 2007; 8 pages.
USPTO Non-Final Rejection for U.S. Appl. No. 09/992,076 dated Jun. 1, 2005; 20 pages.
USPTO Non-Final Rejection for U.S. Appl. No. 09/992,076 dated Aug. 10, 2006; 19 pages.
USPTO Non-Final Rejection for U.S. Appl. No. 09/992,076 dated Nov. 21, 2005; 29 pages.
USPTO Non-Final Rejection for U.S. Appl. No. 09/994,600 dated May 15, 2007; 14 pages.
USPTO Non-Final Rejection for U.S. Appl. No. 09/994,600 dated Jul. 17, 2006; 14 pages.
USPTO Non-Final Rejection for U.S. Appl. No. 09/994,600 dated Aug. 23, 2005; 13 pages.
USPTO Non-Final Rejection for U.S. Appl. No. 09/994,600 dated Oct. 21, 2004; 37 pages.
USPTO Non-Final Rejection for U.S. Appl. No. 09/994,601 dated Oct. 4, 2007; 20 pages.
USPTO Non-Final Rejection for U.S. Appl. No. 09/994,601 dated Sep. 21, 2005; 12 pages.
USPTO Non-Final Rejection for U.S. Appl. No. 09/994,601 dated Nov. 14, 2006; 15 pages.
USPTO Non-Final Rejection for U.S. Appl. No. 09/994,601 dated Jul. 29, 2004; 10 pages.
USPTO Non-Final Rejection for U.S. Appl. No. 09/998,834 dated Sep. 20, 2004; 11 pages.
USPTO Non-Final Rejection for U.S. Appl. No. 09/998,848 dated Jan. 26, 2006; 17 pages.
USPTO Non-Final Rejection for U.S. Appl. No. 09/998,848 dated Jan. 29, 2007; 13 pages.

USPTO Non-Final Rejection for U.S. Appl. No. 09/998,848 dated Feb. 22, 2008; 15 pages.
USPTO Non-Final Rejection for U.S. Appl. No. 09/998,848 dated Dec. 21, 2004; 14 pages.
USPTO Non-Final Rejection for U.S. Appl. No. 09/998,859 dated May 15, 2003; 6 pages.
USPTO Non-Final Rejection for U.S. Appl. No. 09/998,859 dated May 28, 2003; 6 pages.
USPTO Non-Final Rejection for U.S. Appl. No. 09/998,859 dated Nov. 4, 2004; 6 pages.
USPTO Non-Final Rejection for U.S. Appl. No. 10/001,477 dated Jan. 22, 2007; 15 pages.
USPTO Non-Final Rejection for U.S. Appl. No. 10/001,477 dated Mar. 2, 2006; 14 pages.
USPTO Non-Final Rejection for 10/001,477 dated Dec. 6, 2007; 13 pages.
USPTO Non-Final Rejection for U.S. Appl. No. 10/002,217 dated Apr. 3, 2006; 12 pages.
USPTO Non-Final Rejection for U.S. Appl. No. 10/002,217 dated May 19, 2005; 15 pages.
USPTO Non-Final Rejection for U.S. Appl. No. 10/002,217 dated Aug. 3, 2007; 10 pages.
USPTO Non-Final Rejection for U.S. Appl. No. 10/002,217 dated Oct. 2, 2006; 21 pages.
USPTO Non-Final Rejection for U.S. Appl. No. 10/008,096 dated Mar. 7, 2007; 19 pages.
USPTO Non-Final Rejection for U.S. Appl. No. 10/008,096 dated Apr. 17, 2006; 18 pages.
USPTO Non-Final Rejection for U.S. Appl. No. 10/008,096 dated Jun. 14, 2004; 24 pages.
USPTO Non-Final Rejection for U.S. Appl. No. 10/008,096 dated Jun. 24, 2004; 15 pages.
USPTO Non-Final Rejection for U.S. Appl. No. 10/008,096 dated Dec. 12, 2007; 14 pages.
USPTO Non-Final Rejection for U.S. Appl. No. 10/033,027 dated Apr. 20, 2005; 20 pages.
USPTO Non-Final Rejection for U.S. Appl. No. 10/033,027 dated Apr. 26, 2006; 26 pages.
USPTO Non-Final Rejection for U.S. Appl. No. 10/033,027 dated Oct. 18, 2004; 17 pages.
USPTO Non-Final Rejection for U.S. Appl. No. 10/033,027 dated Dec. 18, 2008; 5 pages.
USPTO Non-Final Rejection for U.S. Appl. No. 10/033,027 dated Dec. 21, 2006; 31 pages.
USPTO Non-Final Rejection for U.S. Appl. No. 10/113,065 dated May 20, 2005; 14 pages.
USPTO Non-Final Rejection for U.S. Appl. No. 10/238,966 dated Apr. 6, 2006; 8 pages.
USPTO Non-Final Rejection for U.S. Appl. No. 10/238,966 dated Apr. 19, 2007; 7 pages.
USPTO Non-Final Rejection for U.S. Appl. No. 09/989,762 dated Jul. 27, 2005; 15 pages.
USPTO Non-Final Rejection for U.S. Appl. No. 09/989,762 dated Aug. 10, 2006; 18 pages.
USPTO Non-Final Rejection for U.S. Appl. No. 09/989,767 dated May 12, 2009; 21 pages.
USPTO Non-Final Rejection for U.S. Appt. No. 09/989,767 dated Oct. 6, 2004; 15 pages.
USPTO Non-Final Rejection for U.S. Appl. No. 09/989,771 dated Apr. 30, 2009; 11 pages.
USPTO Non-Final Rejection for U.S. Appl. No. 09/989,782 dated Oct. 27, 2009; 9 pages.
USPTO Non-Final Rejection for U.S. Appl. No. 09/989,817 dated Jan. 12, 2005; 5 pages
USPTO Non-Final Rejection for U.S. Appl. No. 09/989,817 dated Jun. 8, 2004; 7 pages.
USPTO Non-Final Rejection for U.S. Appl. No. 09/994,601 dated Jul. 9, 2009; 11 pages.
USPTO Non-Final Rejection for U.S. Appl. No. 09/998,848 dated May 12, 2009; 16 pages.
USPTO Non-Final Rejection for U.S. Appl. No. 10/001,478 dated Jan. 30, 2008; 19 pages.
USPTO Non-Final Rejection for U.S. Appl. No. 10/001,478 dated Mar. 15, 2006; 19 pages.
USPTO Non-Final Rejection for U.S. Appl. No. 10/001,478 dated Apr. 2, 2007; 17 pages.
USPTO Non-Final Rejection for U.S. Appl. No. 10/001,478 dated May 16, 2005; 13 pages.
USPTO Non-Final Rejection for U.S. Appl. No. 10/001,478 dated Aug. 4, 2009; 17 pages.
USPTO Non-Final Rejection for U.S. Appl. No. 10/001,478 dated Oct. 20, 2008; 18 pages.
USPTO Non-Final Rejection for U.S. Appl. No. 10/001,568 dated May 19, 2005; 16 pages.
USPTO Non-Final Rejection for U.S. Appl. No. 10/004,039 dated Apr. 11, 2006; 14 pages.
USPTO Non-Final Rejection for U.S. Appl. No. 10/004,039 dated Jun. 6, 2005; 17 pages.
USPTO Non-Final Rejection for U.S. Appl. No. 10/004,197 dated Apr. 3, 2006; 13 pages.
USPTO Non-Final Rejection for U.S. Appl. No. 10/004,197 dated Jun. 6, 2005; 21 pages.
USPTO Non-Final Rejection for U.S. Appl. No. 10/011,214 dated Aug. 13, 2004; 10 pages.
USPTO Non-Final Rejection for U.S. Appl. No. 10/113,581 dated Jan. 10, 2007; 14 pages.
USPTO Non-Final Rejection for U.S. Appl. No. 10/113,581 dated Feb. 24, 2006; 11 pages.
USPTO Non-Final Rejection for U.S. Appl. No. 10/113,581 dated Aug. 12, 2005; 12 pages.
USPTO Non-Final Rejection for U.S. Appl. No. 10/113,581 dated Sep. 1, 2009; 18 pages.
USPTO Non-Final Rejection for U.S. Appl. No. 10/113,581 dated Nov. 26, 2008; 20 pages.
USPTO Non-Final Rejection for U.S. Appl. No. 10/113,581 dated Nov. 27, 2007; 15 pages.
USPTO Non-Final Rejection for U.S. Appl. No. 10/137,497 dated Aug. 2, 2008; 21 pages.
USPTO Non-Final Rejection for U.S. Appl. No. 10/137,497 dated Sep. 22, 2005; 21 pages.
USPTO Non-Final Rejection for U.S. Appl. No. 10/137,497 dated Nov. 5, 2004; 17 pages.
USPTO Non-Final Rejection for U.S. Appl. No. 10/256,829 dated Jul. 12, 2012; 7 pages.
USPTO Non-Final Rejection for U.S. Appl. No. 10/256,829 dated Jan. 7, 2009; 7 pages.
USPTO Non-Final Rejection for U.S. Appl. No. 10/256,829 dated May 3, 2006; 16 pages.
USPTO Non-Final Rejection for U.S. Appl. No. 10/256,829 dated Jun. 26, 2008; 11 pages.
USPTO Non-Final Rejection for U.S. Appl. No. 10/256,829 dated Jul. 28, 2005; 14 pages.
USPTO Non-Final Rejection for U.S. Appl. No. 10/256,829 dated Oct. 26, 2009; 8 pages.
USPTO Non-Final Rejection for U.S. Appl. No. 10/256,829 dated Nov. 2, 2006; 13 pages.
USPTO Non-Final Rejection for U.S. Appl. No. 10/272,231 dated Jul. 14, 2003; 6 pages.
USPTO Non-Final Rejection for U.S. Appl. No. 10/324,455 dated Aug. 21, 2003; 4 pages.
USPTO Non-Final Rejection for U.S. Appl. No. 10/324,455 dated Nov. 6, 2003; 4 pages.
USPTO Non-Final Rejection for U.S. Appl. No. 10/327,207 dated Jul. 21, 2006; 12 pages.
USPTO Non-Final Rejection for U.S. Appl. No. 10/327,207 dated Sep. 20, 2005; 11 pages.
USPTO Non-Final Rejection for U.S. Appl. No. 10/653,050 dated Apr. 6, 2004; 7 pages.
USPTO Non-Final Rejection for U.S. Appl. No. 10/803,030 dated Jun. 8, 2005; 4 pages.
USPTO Non-Final Rejection for U.S. Appl. No. 11/088,028 dated Jun. 16, 2006; 8 pages.
USPTO Non-Final Rejection for U.S. Appl. No. 11/125,554 dated Dec. 11, 2006; 9 pages.

USPTO Non-Final Rejection for U.S. Appl. No. 11/166,822 dated Aug. 22, 2010; 11 pages.
USPTO Non-Final Rejection for U.S. Appl. No. 11/166,622 dated Sep. 29, 2009; 11 pages.
USPTO Non-Final Rejection for U.S. Appl. No. 11/200,619 dated Jun. 17, 2009; 12 pages.
USPTO Notice of Allowance for U.S. Appl. No. 09/826,397 dated Oct. 7, 2004; 8 pages.
USPTO Notice of Allowance for U.S. Appl. No. 09/855,868 dated Apr. 25, 2005; 6 pages.
USPTO Notice of Allowance for U.S. Appl. No. 09/875,599 dated Oct. 17, 2006: 4 pages.
USPTO Notice of Allowance for U.S. Appl. No. 09/887,923 dated Sep. 27, 2004; 5 pages.
USPTO Notice of Allowance for U.S. Appl. No. 09/887,955 dated Oct. 12, 2004; 5 pages.
USPTO Notice of Allowance for U.S. Appl. No. 09/893,048 dated Jul. 25, 2006; 4 pages.
USPTO Notice of Allowance for U.S. Appl. No. 09/893,050 dated Jul. 5, 2005; 6 pages.
USPTO Notice of Allowance for U.S. Appl. No. 09/909,047 dated Feb. 15, 2005; 6 pages.
USPTO Notice of Allowance for U.S. Appl. No. 09/909,047 dated May 11, 2005; 25 pages.
USPTO Notice of Allowance for U.S. Appl. No. 09/912,768 dated Sep. 13, 2005; 5 pages.
USPTO Notice of Allowance for U.S. Appl. No. 09/922,579 dated Dec. 28, 2004; 6 pages.
USPTO Notice of Allowance for U.S. Appl. No. 09/923,461 dated May 12, 2005; 6 pages.
USPTO Notice of Allowance for U.S. Appl. No. 09/929,891 dated Jun. 15, 2005; 6 pages.
USPTO Notice of Allowance for U.S. Appl. No. 09/929,891 dated Dec. 23, 2005; 4 pages.
USPTO Notice of Allowance for U.S. Appl. No. 09/930,021 dated Nov. 26, 2004; 4 pages.
USPTO Notice of Allowance for U.S. Appl. No. 09/943,062 dated Jun. 29, 2010; 4 pages.
USPTO Notice of Allowance for U.S. Appl. No. 09/953,423 dated Jul. 12, 2004; 6 pages.
USPTO Notice of Allowance for U.S. Appl. No. 09/957,084 dated May 18, 2004; 5 pages.
USPTO Notice of Allowance for U.S. Appl. No. 09/969,311 dated Mar. 1, 2005; 4 pages.
USPTO Notice of Allowance for U.S. Appl. No. 09/969,313 dated Oct. 4, 2005; 6 pages.
USPTO Notice of Allowance for U.S. Appl. No. 09/972,003 dated Jul. 14, 2004; 4 pages.
USPTO Notice of Allowance for U.S. Appl. No. 09/972,133 dated Jun. 9, 2006; 6 pages.
USPTO Notice of Allowance for U.S. Appl. No. 09/972,319 dated Dec. 30, 2004; 4 pages.
USPTO Notice of Allowance for U.S. Appl. No. 09/975,030 dated Feb. 6, 2006; 7 pages.
USPTO Notice of Allowance for U.S. Appl. No. 09/975,104 dated Oct. 19, 2006; 6 pages.
USPTO Notice of Allowance for U.S. Appl. No. 09/975,115 dated Jan. 29, 2010; 9 pages.
USPTO Notice of Allowance for U.S. Appl. No. 09/977,111 dated Sep. 28, 2006; 6 pages.
USPTO Notice of Allowance for U.S. Appl. No. 09/989,570 dated May 19, 2005; 4 pages.
USPTO Notice of Allowance for U.S. Appl. No. 09/989,570 dated Sep. 10, 2004; 8 pages.
USPTO Notice of Allowance for U.S. Appl. No. 09/989,571 dated Sep. 13, 2005; 6 pages.
USPTO Notice of Allowance for U.S. Appl. No. 09/989,762 dated Jan. 2, 2008; 6 pages.
USPTO Notice of Allowance for U.S. Appl. No. 09/989,762 dated Feb. 22, 2010; 7 pages.
USPTO Notice of Allowance for U.S. Appl. No. 09/989,762 dated Mar. 25, 2009; 7 pages.
USPTO Notice of Allowance for U.S. Appl. No. 09/989,762 dated Jun. 2, 2008; 6 pages.
USPTO Notice of Allowance for U.S. Appl. No. 09/989,762 dated Oct. 24, 2008; 7 pages.
USPTO Notice of Allowance for U.S. Appl. No. 09/989,762 dated Jul. 16, 2009; 6 pages.
USPTO Notice of Allowance for U.S. Appl. No. 09/989,762 dated Oct. 30, 2009; 6 pages.
USPTO Notice of Allowance for U.S. Appl. No. 09/989,765 dated Mar. 31, 2010; 8 pages.
USPTO Notice of Allowance for U.S. Appl. No. 09/989,765 dated Sep. 3, 2009; 7 pages.
USPTO Notice of Allowance for U.S. Appl. No. 09/989,765 dated Dec. 22, 2009; 8 pages.
USPTO Notice of Allowance for U.S. Appl. No. 09/989,777 dated Jan. 15, 2010; 8 pages.
USPTO Notice of Allowance for U.S. Appl. No. 09/989,777 dated Aug. 6, 2009; 8 pages.
USPTO Notice of Allowance for U.S. Appl. No. 09/989,777 dated Mar. 9, 2009; 7 pages.
USPTO Notice of Allowance for U.S. Appl. No. 09/989,817 dated May 9, 2005; 6 pages.
USPTO Notice of Allowance for U.S. Appl. No. 09/992,076 dated Feb. 27, 2009; 6 pages.
USPTO Notice of Allowance for U.S. Appl. No. 09/994,600 dated Jan. 4, 2010; 4 pages.
USPTO Notice of Allowance for U.S. Appl. No. 09/994,600 dated Apr. 3, 2009; 5 pages.
USPTO Notice of Allowance for U.S. Appl. No. 09/994,600 dated Aug. 25, 2009; 4 pages.
USPTO Notice of Allowance for U.S. Appl. No. 10/001,477 dated Mar. 23, 2010; 6 pages.
USPTO Notice of Allowance for U.S. Appl. No. 10/001,477 dated Aug. 26, 2009; 6 pages.
USPTO Notice of Allowance for U.S. Appl. No. 10/001,477 dated Dec. 4, 2009; 7 pages.
USPTO Notice of Allowance for U.S. Appl. No. 10/001,477 dated May 8, 2009; 6 pages.
USPTO Notice of Allowance for U.S. Appl. No. 10/001,478 dated Jun. 2, 2010; 11 pages.
USPTO Notice of Allowance for U.S. Appl. No. 10/001,568 dated Mar. 17, 2006; 9 pages.
USPTO Notice of Allowance for U.S. Appl. No. 10/002,217 dated Jan. 11, 2010; 7 pages.
USPTO Notice of Allowance for U.S. Appl. No. 10/002,217 dated Jun. 8, 2009; 8 pages.
USPTO Notice of Allowance for U.S. Appl. No. 10/002,217 dated Sep. 17, 2009; 6 pages.
USPTO Notice of Allowance for U.S. Appl. No. 10/004,039 dated Aug. 15, 2006; 7 pages.
USPTO Notice of Allowance for U.S. Appl. No. 10/004,197 dated Feb. 9, 2007; 7 pages.
USPTO Notice of Allowance for U.S. Appl. No. 10/004,197 dated Oct. 6, 2006; 7 pages.
USPTO Notice of Allowance for U.S. Appl. No. 10/008,096 dated Feb. 1, 2010; 6 pages.
USPTO Notice of Allowance for U.S. Appl. No. 10/008,096 dated Jun. 5, 2009; 12 pages.
USPTO Notice of Allowance for U.S. Appl. No. 10/008,096 dated Oct. 21, 2009; 6 pages.
USPTO Notice of Allowance for U.S. Appl. No. 10/011,214 dated Apr. 11, 2005; 4 pages.
USPTO Notice of Allowance for U.S. Appl. No. 10/024,093 dated Sep. 10, 2002; 3 pages.
USPTO Notice of Allowance for U.S. Appl. No. 10/033,027 dated Feb. 18, 2010; 4 pages.
USPTO Notice of Allowance for U.S. Appl. No. 10/033,027 dated Sep. 2, 2009; 4 pages.
USPTO Notice of Allowance for U.S. Appl. No. 10/113,581 dated Mar. 5, 2010; 9 pages.
USPTO Notice of Allowance for U.S. Appl. No. 10/137,497 dated Jan. 24, 2007; 12 pages.

USPTO Notice of Allowance for U.S. Appl. No. 10/137,497 dated Jul. 20, 2007; 4 pages.
USPTO Notice of Allowance for U.S. Appl. No. 10/238,966 dated Feb. 1, 2010; 4 pages.
USPTO Notice of Allowance for U.S. Appl. No. 10/238,966 dated Aug. 5, 2009; 5 pages.
USPTO Notice et Allowance for U.S. Appl. No. 10/256,829 dated Mar. 12, 2012; 7 pages.
USPTO Notice of Allowance for U.S. Appl. No. 10/256,829 dated Sep. 29, 2011; 7 pages.
USPTO Notice of Allowance for U.S. Appl. No. 10/256,829 dated May 10, 2010; 4 pages.
USPTO Notice of Allowance for U.S. Appl. No. 10/256,829 dated Oct. 29, 2007; 6 pages.
USPTO Notice of Allowance for U.S. Appl. No. 10/272,231 dated Mar. 8, 2004; 6 pages.
USPTO Notice of Allowance for U.S. Appl. No. 10/324,455 dated Feb. 12, 2004; 4 pages.
USPTO Notice of Allowance for U.S. Appl. No. 10/327,207 dated Jun. 11, 2007; 4 pages.
USPTO Notice of Allowance for U.S. Appl. No. 10/327,207 dated Dec. 26, 2006: 5 pages.
USPTO Notice of Allowance for U.S. Appl. No. 10/653,050 dated Jul. 29, 2004; 3 pages.
USPTO Notice of Allowance for U.S. Appl. No. 10/803,030 dated Jan. 8, 2007; 6 pages.
USPTO Notice of Allowance for U.S. Appl. No. 11/088,028 dated Jan. 26, 2007; 6 pages.
USPTO Notice of Allowance for U.S. Appl. No. 11/088,028 dated Jul. 2, 2007; 6 pages.
USPTO Notice of Allowance for U.S. Appl. No. 11/125,554 dated Feb. 7, 2008; 4 pages.
USPTO Notice of Allowance for U.S. Appl. No. 11/125,554 dated Apr. 24, 2007; 7 pages.
USPTO Notice of Allowance for U.S. Appl. No. 11/273,708 dated Aug. 9, 2007; 4 pages.
USPTO Notice of Allowance for U.S. Appl. No. 11/337,272 dated Aug. 15, 2007; 9 pages.
USPTO Notice of Allowance for U.S. Appl. No. 11/347,189 dated Sep. 27, 2007; 4 pages.
USPTO Notice of Allowance for U.S. Appl. No. 11/709,866 dated Feb. 16, 2010; 7 pages.
USPTO Notice of Allowance for U.S. Appl. No. 11/709,866 dated Apr. 7, 2009: 8 pages.
USPTO Notice of Allowance for U.S. Appl. No. 11/709,866 dated Aug. 4, 2009; 7 pages.
USPTO Notice of Allowance for U.S. Appl. No. 11/799,439 dated Feb. 5, 2010; 4 pages.
USPTO Notice of Allowance for U.S. Appl. No. 11/799,439 dated Jun. 25, 2009; 6 pages.
USPTO Notice of Allowance for U.S. Appl. No. 11/850,260 dated Jul. 2, 2010; 8 pages.
USPTO Notice of Allowance for U.S. Appl. No. 11/965,291 dated Jan. 13, 2010; 4 pages.
USPTO Notice of Allowance for U.S. Appl. No. 11/965,291 dated May 5, 2009; 7 pages.
USPTO Notice of Allowance for U.S. Appl. No. 11/965,677 dated Feb. 12, 2010; 4 pages.
USPTO Notice of Allowance for U.S. Appl. No. 11/983,291 dated Oct. 22, 2009; 7 pages.
USPTO Notice of Allowance for U.S. Appl. No. 11/985,340 dated Feb. 19, 2010; 8 pages.
USPTO Notice of Allowance for U.S. Appl. No. 11/985,340 dated Jun. 2, 2009; 7 pages.
USPTO Notice of Allowance for U.S. Appl. No. 11/985,340 dated Jun. 9, 2010; 8 pages.
USPTO Notice of Allowance for U.S. Appl. No. 11/985,340 dated Nov. 9, 2009; 7 pages.
USPTO Notice of Allowance for U.S. Appl. No. 11/986,338 dated Feb. 16, 2010; 4 pages.
USPTO Notice of Allowance for U.S. Appl. No. 11/986,336 dated Oct. 19, 2009; 4 pages.
USPTO Notice of Allowance for U.S. Appl. No. 11/986,338 dated May 7, 2009; 1 page.
USPTO Notice of Allowance for U.S. Appl. No. 12/060,128 dated Oct. 19, 2009; 8 pages.
USPTO Notice of Allowance for U.S. Appl. No. 12/070,547 dated Feb. 24, 2010; 4 pages.
USPTO Notice of Allowance for U.S. Appl. No. 12/104,672 dated Jan. 11, 2010; 7 pages.
USPTO Notice of Allowance for U.S. Appl. No. 12/218,404 dated Feb. 16, 2010; 7 pages.
USPTO Notice of Allowance for U.S. Appl. No. 12/218,404 dated Jul. 10, 2009; 7 pages.
USPTO Notice of Allowance for U.S. Appl. No. 12/218,404 dated Nov. 3, 2009; 8 pages.
USPTO Requirement for Restriction for U.S. Appl. No. 11/985,340 dated Mar. 16, 2009; 7 pages.
USPTO Requirement for Restriction/Election for U.S. Appl. No. 09/969,313 dated Mar. 18, 2005; 6 pages.
USPTO Requirement for Restriction/Election for U.S. Appl. No. 09/972,003 dated May 6, 2004; 4 pages.
USPTO Requirement for Restriction/Election for U.S. Appl. No. 11/337,272 dated Sep. 11, 2006; 5 pages.
USPTO Requirement for Restriction/Election for U.S. Appl. No. 11/818,005 dated Jul. 14, 2009; 5 pages.
Van Ess, David; "Simulating a 555 Timer with PSoC," Cypress Semiconductor Corporation, Application Note AN2286, May 19, 2005; 10 pages.
Varma et al., "A Structured Test Re-Use Methodology for Core-Based System Chips," IEEE, 1998; 9 pages.
Vixel, "InSpeed SOC 320 Embedded Storage Switch," 2003, Vixel, pp. 1-5; 5 pages.
Wikipedia—Main Page, on Mar. 8, 2006 from http://en.wikipedia.org/wiki/Main_Page and http://en.wikipedia.org/wiki/Wikipedia:Introduction; 5 pages.
Wikipedia—Processor register, retreved on Mar. 7, 2006 from http://en.wikipedia.org/wiki/Processor_register; 4 pages.
Wikipedia.org: "Von Neumann architecture"; retrieved from http://en.wikipedia.org/wiki/Von_Neumann_architecture on Jan. 22, 2007; 4 pages.
Written Opinion of the International Search Authority for International Application No. PCT/US08/60680 dated Aug. 15, 2008; 4 pages.
Written Opinion of the Interriational Searching Authority for Internationai Application No. PCT/US2008/060699 dated Jun. 18, 2009; 4 pages.
Xerox, "Mesa Debugger Documentation," Apr. 1979; Xerox Systems Development Department; Version 5.0, pp. 1-30; 33 pages.
York et al., "On-chip Support Needed for SOC Debug," Electronic Engineering Times, Jun. 1999, pp. 104, 110; 2 pages.
Zorian et al., "Testing Embedded-Core Based System Chips," IEEE, 1998; 14 pages.
Zorian, "Test Requirements for Embedded Core-based Systems and IEEE P1500," IEEE, 1997; 9 pages.
"An Analog PPL-Based Clock and Data Recovery Circuit with High Input Jitter Tolerance," Sun, Reprinted from IEEE Journal of Solid-State Circuits, 1988; 4 pages.
"Electronic Circuit Protector-Circuit Breaker;" IBM Technical Disclosure Bulletin; vol. 36, Issue 8, Aug. 1, 1993; 1 page.
"InCurcuit Emulators—descriptions of the major ICEs around." retrieved on Nov. 14, 2005 from http://www.algonet.se/~staffann/developer/emulator.htm; 6 pages.
"Microsoft Files Summary Judgement Motions"; Feb. 1999; Microsoft PressPass, retrieved on May 20, 2005 from http://www.microsoft.com/presspass/press/1999/feb99/Feb99/Calderapr.asp; 3 pages.
"POD—Piece of Data, Plain Old Documentation, Plain Old Dos . . ."; retrieved on Nov. 14, 2005 from http://www.auditmypc.com/acronym/POD.asp; 2 pages.
"pod-defintion by dict.die.net"; retrieved on Nov. 14, 2005 from http://dict.die.net/pod; 2 pages.
"Pod-Wikipedia, the free encyclopedia"; retrieved on Nov. 14, 2005 from http://en.wikipedia.org/wiki/Pod; 3 pages.

"PSoC designer: Integrated development environment, getting started 25-minute tutorial, version 1.0," Cypress Microsystems., Cypress Microsystems, Inc. CMS10006A, Jul. 3, 2001; 25 pages.

"PS0C technology complete changes 8-hit MCU system design", Cypress Microsystems, Inc, retrieved from <http>://www.archive.org/web/20010219005250/http://cypressmicro.com- /t...>, Feb. 19, 2001; 21 pages.

"The Gemini Netlist Comparison Project;" <http://www.cs.washington.edu/resarch/projects/lis/www/gemini/gemini.html> larry@cs.washington.edu; Mar. 19, 2002; 2 pages.

"Webster's Third New International Dictionary," 1996, G. & C. Merriam Company; 3 pages (including pp. 1328-1329).

A.F. Harvey, "DMA Fundamentals on Various PC Platforms," 2001, 2004, National Instruments Corporation, pp. 1-19; 19 pages.

Adham et al., "Preliminary Outline of the IEEE P1500 Scalable Architecture for Testing Embedded Cores," 1999, IEEE; 6 pages.

Andrew S. Tanenbaum with contributions from James R. Goodman, "Structured Computer Organization," 1999, Prentice Hall, Fourth Edition; 32 pages.

Andrews, "Roadmap for Extending IEEE 1149.1 for Hierarchical Control of Locally-Stored, Standardized command Set, Test Programs," IEEE, 1994; 7 pages.

Anonymous "F/Port:Fast Parallel Port for the PC" Installation Manual Release 7.1, circa 1997, available for download from http://www.fapo.com/fport.htm; 25 pages.

Anonymous, "JEEN JTAG Embedded Ice Ethernet Interface," Aug. 1999, Embedded Performance, Inc.; 3 pages.

Anonymous, "Warp Nine Engineering—The IEEE 1284 Experts-F/Port Product Sheet," undated web page found at http://www.fapo.com/fport.htm; printed on Apr. 12, 2005; 2 pages.

Anonymous; "Using Debug"; 1999; Prentice-Hall Publishing; 20 pages.

U.S. Appl. No. 09/207,912: "Circuit(s), Architecture and Method(s) for Operating and/or Tuning a Ring Oscillator," Monte Mar, filed Dec. 9, 1998; 23 pages.

U.S. Appl. No. 09/842,966: "Precision Crystal Oscillator Circuit Used in Microcontroller," Monte Mar, filed Apr. 25, 2001; 28 pages.

U.S. Appl. No. 09/943,062: "Apparatus and Method for Programmable Power Management in a Programmable Analog Circuit Block," Monte Mar, filed Aug. 29, 2001; 46 pages.

U.S. Appl. No. 09/964,991: "A Novel Band-Gap Circuit for Providing an Accurate Reference Voltage Compensated for Process State, Process Variations and Temperature," Kutz et al., filed Sep. 26, 2001; 26 pages.

U.S. Appl. No. 10/024,093: "Configurable Memory for Programmable Logic Circuits," Lacey et al., filed Dec. 18, 2001; 25 pages.

U.S. Appl. No. 10/137,497: "Reconfigurable Testing System and Method," Pleis et al.; filed May 1, 2002; 40 pages.

U.S. Appl. No. 10/172,670: "Method and System for Programming a Memory Device," Snyder et el.; filed Jun. 13, 2002; 66 pages.

U.S. Appl. No. 10/238,966: "Mehod for Parameterizing a User Module," Perrin et al., fled Sep. 9, 2002; 41 pages.

U.S. Appl. No. 10/256,829: "Graphical User Interface for Dynamically Reconfiguring a Programmable Device," Matthew A. Pleis; Sep. 27, 2002; 57 pages.

U.S. Appl. No. 10/653,050: "Method and System for Pogramming a Memory Device," Snyder et a.; filed Nov. 13, 2007; 34 pages.

U.S. Appl. No. 11/088,028: "Method and Circuit for Rapid Alignmen Signals," Moyal et al., filed Nov. 13, 2007; 34 pages.

U.S. Appl. No. 11/166,622: "Touch Wake for Electronic Devices," Beard et al., filed Jun. 23, 2005; 22 pages.

U.S. Appl. No. 11/864,137 "Configurable Liquid Crystal Display Driver System," David Wrightet al., filed Sep. 28, 2007; 22 pages.

U.S. Appl. No. 11/965,291: "Universal Digital Block Interconnection and Channel Routing," Snyder et al., filed Dec. 27, 2007; 31 pages.

U.S. Appl. No. 11/965,340: "Method and Circuit for Rapid Alignment of Signals," Moyal et al., filed Nov. 13, 2007; 34 pages.

U.S. Appl. No. 11/986,338: Reconfigurable Testing System and Method, Pleis et al., filed Nov. 20, 2007; 41 pages.

U.S. Appl. No. 12/004,833: "Systems and Methods for Dynanamically Reconfiguring a Programmable System on a Chip," Memula, Suresh et al., filed Dec. 21, 2007; 50pages.

U.S. Appl. No. 12/057,149: "Power Management Architecture, Method and Configuration System," Kenneth Ogarni, filed Mar. 27, 2008; 41 pages.

U.S. Appl. No. 12/056,534: "System and Method for Controlling a Target Device," Kenneth Ogami et al., filed Mar. 28, 2008; 55 pages.

U.S. Appl. No. 12/056,569: "Configuration of Programmable IC Design Elements," Best et al., filed Mar. 28, 2008; 19 pages.

U.S. Appl. No. 12/058,586: "System and Method for Monitoring a Target DEViCE," Kenneth Ogami et al., filed Mar. 28, 2008; 56 pages.

U.S. Appl. No. 12/356,468: "System and Method for Dynamically Generating a Configuration Datasheet," Anderson et al.; filed Jan. 20, 2009; 27 pages.

U.S. Appl. No. 12/765,400: "Autonomous Control in a Programmable System," Sullam et al., filed on Apr. 22, 2010; 30 pages.

Atmel Corporation: AT90SC Summary: "Secure Microcontrotlers for Smart Cards," Oct. 1999; 7 pages.

Bakker et al., "Micropower CMOS Temperature Sensor with Digital Output," IEEE Journal of Solid-State Circuits, Jul. 1996; 3 pages.

Balough et al., "White Paper: Comparing IP Integration Approaches for FPGA Implementation," Feb. 2007, Version 1.1, Altera, pp. 1-7; 7 pages.

Bauer et al.; "A Reconfigurable Logic Machine for Fast Event-Driven Simulation"; Jun. 1998; Design Automation Conference Proceedings; 8 pages.

Bursky, "FPGA Combines Multiple Interfaces and Logic," Electronic Design, vol. 48 No. 20, Oct. 2, 2000, pp. 74-78; 5 pages.

Chapweske, Adam; "The PS/2 Mouse Interface," PS/2 Mouse Interfacing, 2001, retrieved on May 18, 2006; 11 pages.

Charles Melear. "Using Background Modes for Testing, Debugging and Emulation of Microcontrollers," IEEE, 1997, pp. 90-97; 8 pages.

Charles, Jr. et al., "Wirebonding: Reinventing the Process for MCMs," Apr. 1998, IEEE 7th International Conference on Multichip Modules and High Density Packaging, pp. 300-302; 3 pages.

USPTO Non-Final Rejection for U.S. Appl. No. 11/201,627 dated Dec. 24, 2009; 22 pages.

USPTO Non-Final Rejection for U.S. Appl. No. 11/201,922 dated Jun. 11, 2010; 12 pages.

USPTO Non-Final Rejection for U.S. Appl. No. 11/273,708 dated Mar. 19, 2007; 16 pages.

USPTO Non-Finai Rejection for U.S. Appl. No. 11/337,272 dated May 17, 2007; 11 pages.

USPTO Non-Final Rejection for U.S. Appl. No. 11/337,272 dated Oct. 24, 2006; 9 pages.

USPTO Non-Final Rejection for U.S. Appl. No. 11/347,189 dated Jun. 8, 2007; 6 pages.

USPTO Non-Final Rejection for U.S. Appl. No. 11/644,100 dated Dec. 16, 2009; 13 pages.

USPTO Non-Final Rejection for U.S. Appl. No. 11/698,660 dated May 21, 2010; 15 pages.

USPTO Non-Final Rejection for U.S. Appl. No. 11/698,660 dated Oct. 7, 2009, 12 pages.

USPTO Non-Final Rejection for U.S. Appl. No. 11/698,660 dated Dec. 2, 2008; 12 pages.

USPTO Non-Final Rejection for U.S. Appl. No. 11/709,866 dated Nov. 7, 2008; 14 pages.

USPTO Non-Final Rejection for U.S. Appl. No. 11/799,439 dated May 29, 2008; 8 pages.

USPTO Non-Final Rejection for U.S. Appl. No. 11/799,439 dated Nov. 2, 2007; 7 pages.

USPTO Non-Final Rejection for U.S. Appl. No. 11/818,005 dated Nov. 23, 2009; 8 pages.

USPTO Non-Final Rejection for U.S. Appl. No. 11/850,260 dated Jan. 14, 2010; 8 pages.

USPTO Non-Final Rejection for U.S. Appl. No. 11/857,947 dated Feb. 3, 2010; 23 pages.

USPTO Non-Final Rejection for U.S. Appl. No. 11/857,947 dated Jul. 21, 2010; 15 pages.

USPTO Non-Final Rejection for U.S. Appl. No. 11/965,291 dated Dec. 17, 2008; 8 pages.

USPTO Non-Final Rejection for U.S. Appl. No. 11/968,145 dated Mar. 4, 2010; 11 pages.

USPTO Non-Final Rejection for U.S. Appl. No. 11/983,291 dated Mar. 9, 2009; 9 pages.
USPTO Non-Final Rejection for U.S. Appl. No. 12/058,569 dated Aug. 2, 2010: 9 pages.
USPTO Non-Final Rejection for U.S. Appl. No. 12/060,176 dated Mar. 30, 2010; 22 pages.
USPTO Non-Final Rejection for U.S. Appl. No. 12/070,547 dated Jun. 3, 2009; 6 pages.
USPTO Non-Final Rejection for U.S. Appl. No. 12/104,678 dated Jul. 2, 2010; 8 pages.
USPTO Non-Final Rejection for U.S. Appl. No. 12/132,527 dated Apr. 29, 2010; 7 pages.
USPTO Non-Final Rejection for U.S. Appl. No. 12/136,557 dated Mar. 15, 2010; 10 pages.
USPTO Non-Final Rejection for U.S. Appl. No. 09/975,338 dated Apr. 5, 2005; 13 pages.
USPTO Notice of Allowance for U.S. Appl. No. 09/975,105 dated Dec. 4, 2006; 4 pages.
USPTO Notice of Allowance for U.S. Appl. No. 09/989,777 dated Jul. 7, 2008; 23 pages.
USPTO Notice of Allowance for U.S. Appl. No. 09/989,777 dated Sep. 15, 2008; 28 pages.
USPTO Notice of Allowance for U.S. Appl. No. 09/989,777 dated Nov. 4, 2008; 3 pages.
USPTO Notice of Allowance for U.S. Appl. No. 09/992,076 dated Nov. 13, 2008; 15 pages.
USPTO Notice of Allowance for U.S. Appl. No. 09/992,076 dated Nov. 29, 2007; 8 pages.
USPTO Notice of Allowance for U.S. Appl. No. 09/992,076 dated Mar. 26, 2008; 23 pages.
USPTO Notice of Allowance for U.S. Appl. No. 09/992,076 dated Jul. 29, 2008; 6 pages.
USPTO Notice of Allowance for U.S. Appl. No. 09/994,600 dated May 14, 2008; 22 pages.
USPTO Notice of Allowance for U.S. Appl. No. 09/994,600 dated Nov. 12, 2008; 35 pages.
USPTO Notice of Allowance for U.S. Appl. No. 09/994,601 dated Dec. 22, 2008; 15 pages.
USPTO Notice of Allowance for U.S. Appl. No. 09/998,834 dated May 19, 2005; 7 pages.
USPTO Notice of Allowance for U.S. Appl. No. 09/998,859 dated Mar. 14, 2005; 6 pages.
USPTO Notice of Allowance for U.S. Appl. No. 10/001,477 dated Nov. 10, 2008; 7 pages.
USPTO Notice of Allowance for U.S. Appl. No. 10/002,217 dated Jan. 28, 2009; 4 pages.
USPTO Notice of Allowance for U.S. Appl. No. 10/002,217 dated Jun. 6, 2008; 7 pages.
USPTO Notice of Allowance for U.S. Appl. No. 10/002,217 dated Oct. 14, 2008; 6 pages.
USPTO Notice of Allowance for U.S. Appl. No. 10/008,096 dated Dec. 22, 2008; 24 pages.
USPTO Notice of Allowance for U.S. Appl. No. 10/033,027 dated Mar. 31, 2009; 7 pages.
USPTO Notice of Allowance for U.S. Appl. No. 10/113,065 dated Apr. 6, 2006; 8 pages.
USPTO Notice of Allowance for U.S. Appl. No. 10/238,966 dated Jan. 27, 2009; 4 pages.
USPTO Notice of Allowance for U.S. Appl. No. 09/475,808 dated Nov. 6, 2001; 8 pages.
USPTO Notice of Allowance for U.S. Appl. No. 09/475,879 dated Oct. 22, 2004; 7 pages.
USPTO U.S. Appl. No. 09/953,423: "A Configurable Input/Output Interface for a Microcontroiler," Warren Snyder, filed Sep. 14, 2001; 28 pages
USPTO U.S. Appl. No. 09/957,084: "A Crystal-Less Osolliator with Trimmable Analog Current Control for Increased Stability," Mar et al., filed Sep. 19, 2001; 28 pages.
USPTO U.S. Appl. No. 09/969,311: "Method for Synchronizing and Resetting Clock Signals Supplied to Multiple Programmable Analog Blocks," Bert Sullam, filed Oct. 1, 2001; 57 pages.
USPTO U.S. Appl. No. 09/969,313: "Architecture for Synchronizing and Resetting Clock Signals Supplied to Multiple Analog Programmable Analog Blocks," Bert Sullam, filed Oct. 1, 2001; 50 pages.
USPTO U.S. Appl. No. 09/972,003: "Test Architecture for Microcontroller Providing for a Serial Communtcation interface," Warren Snyder, filed Oct. 5, 2001; 32 pages.
USPTO U.S. Appl. No. 09/972,133: "Method for Entering Circuit Test Mode," Warren Snyder filed Oct. 5, 2001; 30 pages.
USPTO U.S. Appl. No. 09/972,319: "Method for Applying Instructions to Microprocessor in Test Mode," Warren Snyder, filed Oct. 5, 2001; 31 pages.
USPTO U.S. Appl. No. 09/973,535: "Architecture for Decimation Alocrithm," Warren Snyder, filed Oct. 9, 2001; 26 pages.
USPTO U.S. Appl. No. 09/975,030: "Emulator Chip-Board Architecture for Interface," Snyder et al., filed Oct. 10, 2001; 37 pages.
USPTO U.S. Appl. No. 09/975,104: "Capturing Test/Emulation and Enabling Real-Time Debugging Using FPGA for In-Circuit Emulation," Warren Snyder, filed Oct. 10, 2001; 35 pages.
USPTO U.S. Appl. No. 09/975,105: "Host to FPGA Interface in an In-Circuit Emulation System," Craig Nemecek, filed Oct. 10, 2001; 44 pages.
USPTO U.S. Appl. No. 09/975,115: "ln-System Chip Emulator Architecture," Snyder et al., filed Oct. 10, 2001; 38 pages.
USPTO U.S. Appl. No. 09/975,338: "Method for Breaking Execution of a Test Code in DUT and Emulator Chip Essentially Simultaneously and Handling Complex Breakpoint Events," Nemecek et al., filed Oct. 10, 2001; 34 pages.
USPTO U.S. Appl. No. 09/977,111: "A Frequency Doubler Circuit with Trimmable Current Control," Shutt et al., filed Oct. 11, 2001; 35 pages.
USPTO U.S. Appl. No. 09/989,574: "Method and System for using a Graphics user Interface for Programming an Electronic Device," Bartz et al., filed Nov. 19, 2001; 43 pages.
USPTO U.S. Appl. No. 09/989,815: "A Data Driven Method and System for Monitoring Hardware Resource Usage for Programming an Electric Device," Bartz et al., filed Nov. 19, 2001; 36 pages.
USPTO U.S. Appl. No. 09/989,816: "Datasheet Browsing and Creation with Data-Driven Datasheet Tabs within a Microcontroller Design Tool," Benz et al., filed Nov. 19, 2001; 55 pages.
USPTO U.S. Appl. No. 09/998,834: "A System and a Method for Communication between and Ice and a Production Microcontroller while in a Halt State," Craig Nemecek, filed Nov. 15, 2001; 33 pages.
USPTO U.S. Appl. No. 09/998,859: "A System and a Method for Checking Lock Step Consistency between in Circuit Emulation and a Microcontroller while Debugging Process is in Progress," Craig Nemecek, filed Nov. 15, 2001; 33 pages.
USPTO U.S. Appl. No. 10/000,383: "System and Method of Providing a Programmable Clock Architecture for an Advanced Microcontroller," Sullam et al., filed Oct. 24, 2001; 34 pages.
USPTO U.S. Appl. No. 10/001,477: "Breakpoint Control in an In-Circuit Emulation System," Roe et al., filed Nov. 1, 2001; 43 pages.
USPTO U.S. Appl. No. 10/001;478: "In-Circuit Emulator and POD Synchronized Boot," Nemecek et al., filed Nov. 1, 2001; 44 pages.
USPTO U.S. Appl. No. 10/001,568: "Combined In-Circuit Emulator and Programmer," Nemecek et al., filed Nov. 1, 2001; 47 pages.
USPTO U.S. Appl. No. 10/002,217: "Conditional Branching in an In-Circuit Emulation System," Craig Nemecek, filed Nov. 1, 2001; 43 pages.
USPTO U.S. Appl. No. 10/004,039: "In-Circuit Emulator with Gatekeeper for Watthdog Timer," Nernecek et al., filed Nov. 14, 2001; 46 pages.
USPTO U.S. Appl. No. 10/004,197: "In-Circuit Emulator with Gatekeeper Based Halt Control," , Nemecek et al., filed Nov. 14, 2001; 47 pages.
USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed Oct. 25, 2001; 49 pages.
USPTO U.S. Appl. No. 10/033,027: "Microcontrollable Programmable System on a Chip," Warren Snyder, filed Oct. 22, 2001, 117 pages.

USPTO U.S. Appl. No. 10/113,065: "System and Method for Automatically Matching Components in a Debugging System," Nemecek et al., filed Mar. 29, 2002; 32 pages.
USPTO U.S. Appl. No. 10/272,231: "Digital Configurable Macro Architecture," Warren Snyder, filed Oct. 15, 2002; 36 pages.
USPTO U.S. Appl. No. 10/324,455: "Programmable Oscillator Scheme," Mar et al., filed Dec. 20, 2002; 23 pages.
USPTO U.S. Appl. No. 10/803,030: "Programmable Microcontrollable Architecture (Mixed Analog/Digital)," Snyder et al., filed Mar. 16, 2004; 40 pages.
USPTO U.S. Appl. No. 11/125,554: "A Method for a Efficient Supply to a Microcontroller," Kutz et al., filed May 9, 2005; 41 pages.
USPTO U.S. Appl. No. 11/273,708: "Capacitance Sensor Using Relaxation Oscillators," Snyder et al.; filed Nov. 14, 2005: 33 pages.
USPTO U.S. Appl. No. 11/337,272: "Successive Approximate Capacitance Measurement Circuit;" Warren Snyder, filed Jan. 20, 2006 29 pages.
USPTO U.S. Appl. No. 11/698,660: "Configurable Bus," Kutz et al., filed Jan. 25, 2007; 35 pages.
USPTO U.S. Appl. No. 11/709,866: "Input/Output Multiplexer Bus," Dennis Sequine, filed Feb. 21, 2007; 33 pages.
USPTO U.S. Appl. No. 11/983,291: "Successive Approximate Capacitance Measurement Circuit," Warren Snyder, filed Nov. 7, 2007; 26 pages.
USPTO U.S. Appl. No. 12/132,527: "System and Method for Performing Next Placements and Pruning of Disallowed Placements for Programming an Integrated Circuit," Ogarni et al., filed Jun. 3, 2008; 44 pages.
USPTO Ex Parte Qualyle Action for U.S. Appl. No. 09/992,076 dated Jun. 18, 2007; 6 pages.
USPTO Ex Parte Quayle Action for U.S. Appl. No. 09/975,115 dated Aug. 20, 2009; 7 pages.
USPTO Final Rejection for U.S. Appl. No. 09/975,105 dated Jul. 13, 2006; 7 pages.
USPTO Final Rejection for U.S. Appl. No. 09/975,115 dated Feb. 21, 2007; 25 pages.
USPTO Final Rejection for U.S. Appl. No. 09/975,115 dated May 12, 2008; 33 pages.
USPTO Final Rejection for U.S. Appl. No. 09/975,115 dated Jun. 23, 2006; 20 pages.
USPTO Final Rejection for U.S. Appl. No. 09/989,765 dated Mar. 31, 2009; 18 pages.
USPTO Final Rejection for U.S. Appl. No. 09/989,765 dated Apr. 3, 2007; 12 pages.
USPTO Final Rejection for U.S. Appl. No. 09/989,765 dated Apr. 4, 2008; 16 pages.
USPTO Final Rejection for U.S. Appl. No. 09/989,765 dated Apr. 17, 2006; 12 pages.
USPTO Final Rejection for U.S. Appl. No. 09/989,767 dated Jan. 11, 2007; 12 pages.
USPTO Final Rejection for U.S. Appl. No. 09/989,767 dated Jan. 15, 2009; 21 pages.
USPTO Final Rejection for U.S. Appl. No. 09/989,767 dated Mar. 6, 2006; 15 pages.
USPTO Final Rejection for U.S. Appl. No. 09/989,767 dated Apr. 6, 2005; 13 pages.
USPTO Final Rejection for U.S. Appl. No. 09/989,767 dated Dec. 27, 2007; 21 pages.
USPTO Final Rejection for U.S. Appl. No. 09/969,771 dated Feb. 27, 2007; 8 pages.
USPTO Final Rejection for U.S. Appl. No. 09/989,771 dated Mar. 28, 2006; 9 pages.
USPTO Final Rejection for U.S. Appl. No. 09/989,771 dated Apr. 6, 2005; 7 pages.
USPTO Final Rejection for U.S. Appl. No. 09/989,771 dated Dec. 10, 2008; 12 pages.
USPTO Final Rejection for U.S. Appl. No. 09/989,771 dated Dec. 27, 2007; 15 pages.
USPTO Final Rejection for U.S. Appl. No. 09/989,777 dated Jan. 30, 2008; 14 pages.
USPTO Final Rejection for U.S. Appl. No. 09/989,777 dated Mar. 13, 2007; 24 pages.
USPTO Final Rejection for U.S. Appl. No. 09/989,777 dated Dec. 21, 2005; 29 pages.
USPTO Final Rejection for U.S. Appl. No. 09/989,778 dated Mar. 16, 2009; 26 pages.
USPTO Final Rejection for U.S. Appl. No. 09/989,778 dated Jan. 8, 2009; 25 pages.
USPTO Final Rejection for U.S. Appl. No. 09/969,778 dated Feb. 5, 2007; 17 pages.
USPTO Final Rejection for U.S. Appl. No. 09/989,778 dated Feb. 15, 2006; 9 pages.
USPTO Final Rejection for U.S. Appl. No. 09/989,778 dated Dec. 20, 2007; 14 pages.
USPTO Final Rejection for U.S. Appl. No. 09/989,782 dated Jul. 9, 2008; 10 pages.
USPTO Final Rejection for U.S. Appl. No. 09/989,782 dated Jul. 24, 2007; 9 pages.
USPTO Final Rejection for U.S. Appl. No. 09/989,782 dated Sep. 21, 2006; 10 pages.
USPTO Final Rejection for U.S. Appl. No. 09/989,782 dated Nov. 3, 2005; 11 pages.
USPTO Final Rejection for U.S. Appl. No. 09/992,076 dated Jan. 30, 2007; 32 pages.
USPTO Final Rejection for U.S. Appl. No. 09/992,076 dated Mar. 17, 2006; 16 pages.
USPTO Final Rejection for U.S. Appl. No. 09/994,600 dated Feb. 13, 2006; 13 pages.
USPTO Final Rejection for U.S. Appl. No. 09/994,600 dated May 4, 2005; 16 pages.
USPTO Final Rejection for U.S. Appl. No. 09/994,600 dated Oct. 17, 2007; 13 pages.
USPTO Final Rejection for U.S. Appl. No. 09/994,600 dated Dec. 8, 2006; 14 pages.
USPTO Final Rejection for U.S. Appl. No. 09/994,601 dated Apr. 17, 2008, 24 pages.
USPTO Final Rejection for U.S. Appl. No. 09/994,601 dated May 18, 2007; 17 pages.
USPTO Final Rejection for U.S. Appl. No. 09/994,601 dated Mar. 8, 2006; 11 pages.
USPTO Final Rejection for U.S. Appl. No. 09/994,601 dated Mar. 24, 2005; 10 pages.
USPTO Final Rejection for U.S. Appl. No. 09/988,848 dated Jun. 14, 2005; 17 pages.
USPTO Final Rejection for U.S. Appl. No. 09/998,848 dated Jul. 25, 2006; 16 pages.
USPTO Final Rejection for U.S. Appl. No. 09/998,848 dated Aug. 10, 2007; 14 pages.
USPTO Final Rejection for U.S. Appl. No. 09/998,848 dated Nov. 24, 2008; 15 pages.
USPTO Final Rejection for U.S. Appl. No. 09/998,859 dated Nov. 19, 2003; 5 pages.
USPTO Final Rejection for U.S. Appl. No. 10/001,477 dated Jun. 30, 2008; 15 pages.
USPTO Final Rejection for U.S. Appl. No. 10/001,477 dated Jul. 23, 2007; 16 pages.
USPTO Final Rejection for U.S. Appl. No. 10/001,477 dated Aug. 24, 2006; 13 pages.
USPTO Final Rejection for U.S. Appl. No. 10/001,477 dated Oct. 24, 2005; 13 pages.
USPTO Final Rejection for U.S. Appl. No. 10/002,217 dated Feb. 6, 2008; 10 pages.
USPTO Final Rejection for U.S. Appl. No. 10/002,217 dated Mar. 7, 2007; 12 pages.
USPTO Final Rejection for U.S. Appl. No. 10/002,217 dated Nov. 17, 2005; 17 pages.
USPTO Final Rejection for U.S. Appl. No. 10/008,096 dated Feb. 10, 2005; 15 pages.
USPTO Final Rejection for U.S. Appl. No. 10/008,096 dated Jun. 16, 2008; 23 pages.
USPTO Final Rejection for U.S. Appl. No. 10/008,096 dated Sep. 4, 2007; 19 pages.
USPTO Final Rejection for U.S. Appl. No. 10/008,096 dated Oct. 13, 2006; 17 pages.

USPTO Final Rejection for U.S. Appl. No. 10/008,096 dated Nov. 25, 2005; 17 pages.
USPTO Final Rejection for U.S. Appl. No. 10/033,027 dated Jun. 8, 2007; 8 pages.
USPTO Final Rejection for U.S. Appl. No. 10/033,027 dated Aug. 9, 2006; 6 pages.
U.S. Appl. No. 60/876,866 "Boost buffer aid for reference buffer," Nandakishore Raimar et al., filed Dec. 22, 2006; 18 pages.
Application No. PCT/US08/60699 "Active Liquid Crystal Display Drivers and Duty Cycle Operation," Filed on Apr. 17, 2008; 23 pages.
U.S. Appl. No. 61/566,233: "Fast Startup Circuit and Method for Ultra Low Power Analog Circuits," Gary Moscaluk, dated Dec. 2, 2011; 11 pages.
USPTO Advisory Action for U.S. Appl. No. 11/965,520 dated Oct. 17, 2012; 2 pages.
USPTO Advisory Action for U.S. Appl. No. 13/100,876 dated Oct. 4, 2012; 3 pages.
USPTO Final Rejection for U.S. Appl. No. 11/965,485 dated Sep. 24, 2012; 15 pages.
USPTO Final Rejection for U.S. Appl. No. 11/965,520 dated Aug. 6, 2012; 13 pages.
USPTO Final Rejection for U.S. Appl. No. 13/332,178 dated Oct. 2, 2012; 19 pages.
USPTO Non-Final Rejection for U.S. Appl. No. 11/843,216 dated Oct. 6, 2009; 7 pages.
USPTO Notice of Allowance for U.S. Appl. No. 10/256,829 dated Sep. 12, 2012; 4 page.
USPTO Notice of Allowance for U.S. Appl. No. 11/843,216 dated Feb. 22, 2010; 6 pages.
USPTO Notice of Allowance for U.S. Appl. No. 11/983,578 dated Oct. 15, 2012; 11 pages.
Specks et al., "A Mixed Digital-Analog 16B Microcontroller with 0.5MB Flash Memory, On-Chip Power Supply, Physical Network Interface, and 40VI/O for Automotive Single-Chip Mechatronics," IEEE, Feb. 9, 2000; 1 page.
Stallman et al., "Debugging with the GNU Source-Level Debugger"; Jan. 1994; retrieved on May 2, 2005 from http://www.cs.utah.edu; 4 pages.
Stan Augarten; "The Chip Collection—Introduction—Smithsonian Institute"; "State of the Art"; "The First 256-Bit Static RAM"; retrieved on Nov. 14, 2005 from http://smithsonianchips.si.edu/augarten/p24.htm; 2 pages.
Stephen Walters, "Computer-Aided Prototyping for ASIC-Based Systems," 1991, IEEE Design & Test of Computers, vol. 8, Issue 2, pp. 4-10; 8 pages.
U.S. Appl. No. 60/243,708: "Advanced Programmable Microcontroller Device," Snyder et al., filed Oct. 26, 2000; 277 pages.
The Written Opinion of the international Search Report for International Application No. PCT/US10/33626 mailed Jun. 24, 2010; 5 pages
Tran et al,, "Fine Pitch and Wirebonding and Reliability of Aluminum Capped Copper Bond Pads," May 2000, IEEE Electronic Components and Technology Conference, pp. 1674-1680, 7 pages.
USPTO Advisory Action for U.S. Appl. No. 09/989,778 dated May 15, 2006; 4 pages.
USPTO Advisory Action for U.S. Appl. No. 09/998,848 dated Sep. 7, 2005; 3 pages.
USPTO Advisory Action for U.S. Appl. No. 10/001,477 dated Oct. 10, 2008; 3 pages.
USPTO Advisory Action for U.S. Appl. No. 09/475,879 dated Mar. 4, 2002; 3 pages.
USPTO Advisory Action for U.S. Appl. No. 09/475,879 dated Dec. 31, 2001; 3 pages.
USPTO Advisory Action for U.S. Appl. No. 09/875,599 dated Jun. 8, 2005; 3 pages.
USPTO Advisory Action for U.S. Appl. No. 09/969,311 dated Jul. 21, 2003; 2 pages.
USPTO Advisory Action for U.S. Appl. No. 09/972,133 dated Aug. 31, 2005; 3 pages.
USPTO Advisory Action for U.S. Appl. No. 09/975,338 dated May 15, 2006; 4 pages.
USPTO Advisory Action for U.S. Appl. No. 09/989,570 dated Aug. 14, 2003; 3 pages.
USPTO Advisory Action for U.S. Appl. No. 09/989,778 dated Jun. 17, 2009; 3 pages.
USPTO Advisory Action for U.S. Appl. No. 10/001,478 dated Jun. 30, 2009; 3 pages.
USPTO Advisory Action for U.S. Appl. No. 11/166,622 dated May 27, 2009; 3 pages.
USPTO Advisory Action for U.S. Appl. No. 11/201,627 dated Aug. 5, 2010; 3 pages.
USPTO Advisory Action for U.S. Appl. No. 11/201,627 dated Sep. 21, 2009; 3 pages.
USPTO Advisory Action for U.S. Appl. No. 11/337,272 dated Apr. 3, 2007; 3 pages.
USPTO Advisory Action for U.S. Appl. No. 11/644,100 dated Jul. 21, 2010; 3 pages.
USPTO Advisory Action for U.S. Appl. No. 11/698,660 dated Jul. 31, 2009; 3 pages.
USPTO Advisory Action for U.S. Appl. No. 11/818,005 dated Jul. 30, 2010; 3 pages.
USPTO Advisory Action for U.S. Appl. No. 11/850,260 dated Nov. 2, 2009; 3 pages.
USPTO Advisory Action for U.S. Appl. No. 09/994,601 dated May 23, 2006; 3 pages.
USPTO U.S. Appl. No. 09/275,336: "Programmable Oscillator Scheme," Mar et al., filed Mar. 24, 1999; 25 pages.
USPTO U.S. Appl. No. 09/475,808: "Configurable Memory for Programmable Logic Circuits," Lacey et al., filed Dec. 30, 1999; 24 pages.
USPTO U.S. Appl. No. 09/475,879: "Programmable Logic Device," Lacer et al.; filed Dec. 30, 1999; 50 pages.
USPTO U.S. Appl. No. 09/721,316: "Pogrammabe Oscillaor Scheme," Mar et al., filed Nov. 22, 2000; 26 pages.
USPTO U.S. Appl. No. 09/826,397: "Method and Circuit for Allowing a Microprocessor to Change its Operating Frequency on-the-fly," Bert Sullam, filed Apr. 2, 2001; 24 pages.
USPTO U.S. Appl. No. 09/855,868: "Protecting Access to Microcontroller Memory Blocks," Warren Snyder, filed May 14, 2001; 28 pages.
USPTO U.S. Appl. No. 09/875,599: "Method and Apparatus for Pogamming a Flash Memory," Warren Snyder, filed May 14, 2001; 28 pages.
USPTO U.S. Appl. No. 09/887,923: "Novel Method and System for Interacting between a Processor and a Power on Reset to Dynamically Control Power States in a Microcontroller," Kutz et al., filed Jun. 22, 2001; 44 pages.
USPTO U.S. Appl. No. 09/887,955: "Novel Power on Reset Circuit for Microcontroller," Kutz et al., filed Jun. 22, 2001; 42 pages.
USPTO U.S. Appl. No. 09/893,048: "A Microcontroller having an On-Chip High Gain Amplifier," Kutz et al., filed Jun. 26, 2001; 22 pages.
USPTO U.S. Appl. No. 09/893,050: "Multiple Use of Microcontroller Pad," Kutz et al., filed Jun. 26, 2001; 21 pages.
USPTO U.S. Appl. No. 09/909,045: "Digital Configurable Macro Architecture," Warren Snyder, filed Jul. 18, 2001; 37 pages.
USPTO U.S. Appl. No. 09/909,047: "A Programmable Analog System Architecture," Monte Mar, filed Jul. 18, 2001; 60 pages.
USPTO U.S. Appl. No. 09/909,109: "Configuring Digital Functions in a Digital Configurable Macro Architecture," Warren Snyder, filed Jul. 18, 2001; 38 pages.
USPTO U.S. Appl. No. 09/912,768: "A Microcontroller having a Dual Mode Relax Oscilator that is Trimmable," James Shutt; filed Jul. 24, 2001; 33 pages.
USPTO U.S. Appl. No. 09/922,419: "A Power Supply Pump Circuit for a Microcontrbiter," Kutz et al., filed Aug. 3, 2001; 38 pages.
USPTO U.S. Appl. No. 09/922,579: "A Method for a Efficient Supply to a Microcontroller," Kutz et al., filed Aug. 3, 2001; 37 pages.
USPTO U.S. Appl. No. 09/923,461: "Non-Interfering Multiply-Mac (Multipty Accumulate) Circuit," Warren Snyder, filed Aug. 6, 2001; 25 pages.
USPTO U.S. Appl. No. 09/924,734: "Programmable Microcontroller (PSoC) Architecture (Mixed Analog/Digital)", Snyder et al., filed Aug. 7, 2001; 28 pages.

USPTO U.S. Appl. No. 09/929,891: "Programming Architecture for a Programmable Analog System," Mar et al., filed Aug. 14, 2001; 82 pages.
USPTO U.S. Appl. No. 09/930,021:"Progammable Methodology and Architecture for a Programmable Analog System"; Mar et al., filed Aug. 14, 2001; 87 pages.
USPTO U.S. Appl. No. 09/935,454: "Method and Apparatus for Local and Global Power Management in a Programmable Analog Circuit," Monte Mar, flled Aug. 22, 2001; 56 pages.
USPTO Final Rejection for U.S. Appl. No. 10/033,027 dated Oct. 31, 2005; 24 pages.
USPTO Final Rejection for U.S. Appl. No. 10/113,065 dated Oct. 26, 2005; 17 pages.
USPTO Final Rejection for U.S. Appl. No. 10/238,966 dated Sep. 27, 2007; 9 pages.
USPTO Final Rejection for U.S. Appl. No. 09/475,879 dated Oct. 11, 2001; 10 pages.
USPTO Final Rejection for U.S. Appl. No. 09/875,599 dated Feb. 15, 2006; 18 pages.
USPTO Final Rejection for U.S. Appl. No. 09/875,599 dated Mar. 29, 2005; 20 pages.
USPTO Final Rejection for U.S. Appl. No. 09/875,599 dated Apr. 26, 2004; 15 pages.
USPTO Final Rejection for U.S. Appl. No. 09/875,599 dated Aug. 25, 2004; 17 pages.
USPTO Final Rejection for U.S. Appl. No. 09/875,599 dated Nov. 21, 2005; 16 pages.
USPTO Final Rejection for U.S. Appl. No. 09/893,050 dated Aug. 30, 2004; 13 pages.
USPTO Final Rejection for U.S. Appl. No. 09/912,768 dated Nov. 17, 2004; 13 pages.
USPTO Final Rejection for U.S. Appl. No. 09/930,021 dated Aug. 31, 2004; 8 pages.
USPTO Final Rejection for U.S. Appl. No. 09/957,084 dated Jan. 29, 2004; 8 pages.
USPTO Final Rejection for U.S. Appl. No. 09/957,084 dated Apr. 23, 2003; 8 pages.
USPTO Final Rejection for U.S. Appl. No. 09/969,311 dated Apr. 7, 2003; 7 pages.
USPTO Final Rejection for U.S. Appl. No. 09/972,133 dated Mar. 30, 2006; 8 pages.
USPTO Final Rejection for U.S. Appl. No. 09/972,133 dated Jun. 29, 2005; 10 pages.
USPTO Final Rejection for U.S. Appl. No. 09/975,104 dated Feb. 15, 2006; 7 pages.
USPTO Final Rejection for U.S. Appl. No. 09/975,338 dated Jan. 18, 2006; 12 pages.
USPTO Final Rejection for U.S. Appl. No. 09/975,338 dated Jan. 31, 2008; 21 pages.
USPTO Final Rejection for U.S. Appl. No. 09/975,338 dated Feb. 27, 2007; 23 pages.
USPTO Final Rejection for U.S. Appl. No. 09/989,570 dated May 30, 2003; 9 pages.
USPTO Final Rejection for U.S. Appl. No. 09/989,571 dated Jan. 26, 2005; 11 pages.
USPTO Final Rejection for U.S. Appl. No. 09/989,762 dated Jan. 26, 2007; 13 pages.
USPTO Final Rejection for U.S. Appl. No. 09/989,762 dated Mar. 14, 2006; 19 pages.
USPTO Final Rejection for U.S. Appl. No. 09/989,767 dated Dec. 7, 2009; 22 pages.
USPTO Final Rejection for U.S. Appl. No. 09/989,771 dated Nov. 25, 2009; 12 pages.
USPTO Final Rejection for U.S. Appl. No. 09/989,782 dated May 15, 2009; 10 pages.
USPTO Final Rejection for U.S. Appl. No. 09/994,601 dated Jan. 5, 2010; 13 pages.
USPTO Final Rejection for U.S. Appl. No. 09/998,848 dated Dec. 10, 2990; 16 pages.
USPTO Final Rejection for U.S. Appl. No. 10/001,478 dated Apr. 20, 2009; 16 pages.
USPTO Final Rejection for U.S. Appl. No. 10/001,478 dated Jun. 4, 2008: 18 pages.
USPTO Final Rejection for U.S. Appl. No. 10/001,478 dated Sep. 5, 2006; 19 pages.
USPTO Final Rejection for U.S. Appl. No. 10/001,478 dated Sep. 17, 2007; 15 pages.
USPTO Final Rejection for U.S. Appl. No. 10/001,568 dated Oct. 26, 2005; 16 pages.
USPTO Final Rejection for U.S. Appl. No. 10/004,039 dated Nov. 22, 2005; 19 pages.
USPTO Final Rejection for U.S. Appl. No. 10/004,197 dated Nov. 23, 2005; 17 pages.
USPTO Final Rejection for U.S. Appl. No. 10/011,214 dated Jan. 21, 2005; 8 pages.
USPTO Final Rejection for U.S. Appl. No. 10/113,581 dated May 11, 2009; 21 pages.
USPTO Final Rejection for U.S. Appl. No. 10/113,581 dated Jun. 11, 2008 14 pages.
USPTO Final Rejection for U.S. Appl. No. 10/113,581 dated Jul. 13, 2007; 15 pages.
USPTO Final Rejection for U.S. Appl. No. 10/113,581 dated Aug. 10, 2006; 13 pages.
USPTO Final Rejection for U.S. Appl. No. 10/137,497 dated Mar. 13, 2006; 15 pages.
USPTO Final Rejection for U.S. Appl. No. 10/137,497 dated May 5, 2005; 13 pages.
USPTO Final Rejection for U.S. Appl. No. 10/256,829 dated Jan. 27, 2006; 24 pages.
USPTO Final Rejection for U.S. Appl. No. 10/256,829 dated Jun. 1, 2007; 16 pages.
USPTO Final Rejection for U.S. Appl. No. 10/256,829 dated Jun. 23, 2009; 8 pages.
USPTO Final Rejection for U.S. Appl. No. 10/272,231 dated Nov. 5, 2003; 5 pages.
USPTO Final Rejection for U.S. Appl. No. 10/327,207 dated Mar. 2, 2006; 13 pages.
USPTO Final Rejection for U.S. Appl. No. 11/166,622 dated Mar. 10, 2009; 11 pages.
Ching et al., "An In-Curcuit-Emulator for TMS320C25," IEEE, 1994, pp. 51-56; 6 pages.
Cypress Semiconductor Corporation, "CY8C21x34 Data Sheet," CSR User Module, CSR V.1.0; Oct. 6, 2005; 36 pages.
Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.
Cypress Semiconductor Corporation, "FAN Controller CG6457AM and CG6462AM," PSoC Mixed Signal Array Preliminary Data Sheet; May 24, 2005; 25 pages.
Cypress Semiconductor Corporation, "PSoC CY8C20x34 Technical Reference Manual (TRM)," PSoC CY8C20x34 TRM, Version 1.0, 2006; 218 pages.
Cypress Semiconductor Corporation. "PSoC Mixed-Signal Controllers," Production Description; <http://www.cypress.com/portal/server>; retrieved on Sep. 27, 2005; 2 pages.
Cypress Semiconductor Corporation, "Release Notes sm017," Jan. 24, 2007; 3 pages.
Dahl et al., "Emulation of the Sparcle Microprocessor with the MIT Virtual Wires Emulation System," 1994, IEEE, pp. 14-22; 9 pages.
Daniel B. Sedory, "A Guide to DEBUG," 2004, retrieved on May 20. 2005 from http://www.geocites.com/thestarman3/asm/debug/debug2.htm, pp. 1-11; 7 pages.
Dick Pasternak, "In-Circuit-Emulation in ASIC Architecture Cor Designs," IEEE. 1989, pp. P6-4.1-P6-4.4; 4 pages.
Duvvuru et at, "Evaluation of a Branch Target Address Cache," 1995, IEEE, pp. 173-180; 8 pages.
Ebeling et al., "Validating VLSI Circuit Layout by Wirelist Comparison," Sep. 1983, In the Proceedings of the IEEE International Conference on Computer Aided Design (lCCAD-83), pp. 172-173; 2 pages.
Ebling, "Gemini II: A Second Generation Layout Validation Program;" 1988; in proceedings of the IEEE International Conference on Computer Aided Design (ICCAD-88); 4 pages.

Ganapathy et al., "Hardware Emulation for Functional Verification of K5", Jun. 1996, 33rd Design Automation Conference Proceedings, Jun. 3-7, 1996, pp. 315-318; 4 pages.

Ghosh et al., "A Low Overhead Design for Testability and Test Generation Technique for Core-based Systems,"IEEE, 1997; 10 pages.

Haberl et al., "Self Testable Boards with Standard IEEE 1149.5 Module Test and Maintenance (MTM) Bus Interface," IEEE, 1994; 6 pages.

Harrison et al.; "Xilinx FPGA Design in a Group Environment Using VHDS and Synthesis Tools"; Colloquium on Digital System Design Using Synthesis Techniques; Feb. 15, 1996; 4 pages.

Hintz et al., "Microcontrollers," 1992, McGraw-Hill, pp. 29-37; 11 pages.

Hong et al., "An FPGA-Based Hardware Emulator for Fast Fault Emulation," IEEE, 1997, pp. 345-348; 4 pages.

Hong et al., "Hierarchial System Test by an IEEE 1149.5 MTM-Bus Slave-Module Interface Core," IEEE, 2000; 14 pages.

Hsieh et al, "Modeling Micro-Controller Peripherals for High-Level Co-Simulation and Synthesis," IEEE, 1997, pp. 127-130; 4 pages.

Huang et al., "Iceberg: An Embedded In-Circuit Emulator Synthesizer for Microcontrollers", Proceedings of the 36th Design Automoation Conference, Jun. 1999, pp. 580-585; 6 pages.

Hwang et al., "Integrated circuit for automatically varying resistance in computer system, has pair of transistors connected in parallel with respective resistors such that resistors are bypassed when corresponding transistors are enabled," Derwent information LTD; 2002; 2 pages.

International Search Report for International Application No. PCT/US2006/09572 dated Jan. 10, 2008; 2 pages.

International Search Report for International Application No. PCT/US10/33626 mailed Jun. 24, 2010; 3 pages.

International Written Opinion of the International Searching Authority for International Application No. PCT/US2006/09572 dated Jan. 10, 2008; 5 pages.

Ito et al., "A Comparison of Microcontrollers Targeted to FPGA-Based Embedded Applications", Sep. 2000, Proceedings of 13th Symposium on Integrated Circuits and Systems Design, Sep. 18-24, 2000, pp. 397-402; 6 pages.

Jinbn Zhao, et al._Steady-State and Dynamic Analysis of a Buck Converter Using a Hysteretic PWM Contol_Dated 2004_5 pages.

John Mangino, "Using DMA with High Performance Peripherals to Maximize System Performance," 2007, Texas Instruments, pp. 1-23; 23 pages.

Jonathan B. Rosenburg, "How Debuggers Work" John Wiley & Sons, Inc. 1996; 259 pages.

Julio Faura et al.; "A Novel Mixed Signal Programmable Device With On-Chip Microprocessor", 1997, IEEE 1997 Custom Integrated Circuits Conference, pp. 103-106; 4 pages.

Khan et al.; "FPGA Architectures for Asic Hardware Emulators"; IEEE 1993, pp. 336-340; 5 pages.

Kory Hopkins, "Definition;" Jan. 16, 1997; <http://www.cs.sfu.ca/cs/people/GradStudent.html>; 1 page.

Lee, Mark; "EMC Design Considerations for PSoC CapSense Applications," Cypress Semiconductor Corporation,Application Note AN2318; Sep. 16, 2005; 6 pages.

M. Mooris Mano, "Computer System Architecture," 1982, Prentice-Hall, 2nd Edition, pp. 261-264 and 435-440; 14 pages.

Maroufi et al., "Solving the I/O Bandwidth Problem in System on a Chip Testing." IEEE, 2000; 6 pages.

Marsh, "Smart Tools Illuminate Deeply Embedded Systems," EDN, vol. 45 No. 3, Feb. 3, 2000, pp. 129-138; 7 pages.

Microsoft Press Computer User's Dictionary; 1998; 3 pages (including p. 18).

Mohammad Al-Shyoukh and Hoi Lee_A Compact Fully-Integrated Extrernum-Selector-Based Soft-Start Circuit for Voltage Regulators in Bulk CMOS Technologies_Oct. 2010_5 pages.

Monte Mar et al., "An architecture for a configurable Mixed-signal device", 2003, IEEE Journal of Solid-State Circuits, vol. 3, pp. 565-568; 4 pages.

Morrison, Gale, "IBM Eyes Merchant Packaging Services," Jul. 13, 2998, Electronic News, available at http://www.findarticles.com; 3 pages, Jul. 13, 1998.

Nam et al., "Fast Development of Source-Level Debugging System Using Hardware Emuiation," IEEE, 2000, pp. 400-404; 4 pages.

Oh et al., Emulator Environment Based on an FPGA Prototyping Board, IEEE, Jun. 21-23, 2000, pp. 72-77; 6 pages.

Ohlnch et al., "Sub-Gemini: Identifying Subcircuits using a Fast Subgraph Isomorphism Algorithm;" Jun. 1993; in proceedings of the 30th IEEE/ACM Design Automation Conference; 7 pages.

Papachristou et al., "Microprocessor Based Testing for Core-Based System on a Chip," IEEE, 1999; 6 pages.

Robert A. Blauschild, "WP 3.5: An Integrated Time Reference," ISSCC94/Session 3, Analog Techniques/Paper WP 3.5. Feb. 1994, pp. 56-58; 4 pages.

Robinson, Gordon D., "Why 1149.1 (JTAG) Really Works", May 1994, Conference Proceedings Electro/94 International, May 10-12, 1994, Combined Volumes, pp. 749-754; 6 pages.

Sedra, Adel S. et al., "Microelectronic Circuits," 3rd Edition, Oxford University Press, pp. xiii-xx and 861-883, 1991; 20 pages.

Seguine, Ryan; "Layout Guidelines for PSoC CapSense," Cypress Semiconductor Corporation, Application Note AN2292; Jul. 22, 2005; 13 pages.

Song et al., "A 50% Power Reduction Scheme for CMOS Relaxation Oscillator," IEEE, 1999, pp. 154-157; 4 pages.

USPTO Notice of Allowance for U.S. Appl. No. 10/265,829 dated Nov. 27, 2012; 5 pages.

* cited by examiner

GRAPHICAL USER INTERFACE FOR DYNAMICALLY RECONFIGURING A PROGRAMMABLE DEVICE

PRIORITY CLAIM

This application is a continuation of U.S. patent application Ser. No. 10/256,829, filed Sep. 27, 2002, which is incorporated herein by reference in its entirety and which is a continuation of U.S. patent application Ser. No. 09/989,817, filed Nov. 19. 2001. now U.S. Pat. No. 6,971,004, issued Nov. 29, 2005.

RELATED APPLICATIONS

This application is related to co-pending commonly-owned U.S. patent application Ser. No. 10/033,027, filed Oct. 22, 2001, entitled "MICROCONTROLLER PROGRAMMABLE SYSTEM ON A CHIP," U.S. patent application Ser. No. 09/989,574, filed Nov. 19, 2001, entitled "METHOD AND SYSTEM FOR USING A GRAPHICS USER INTERFACE FOR PROGRAMMING AN ELECTRONIC DEVICE," U.S. patent application Ser. No. 09/989,570, filed Nov. 19, 2001, entitled "METHOD FOR FACILITATING MICROCONTROLLER PROGRAMMING," U.S. patent application Ser. No. 09/989,571, filed Nov. 19, 2001, entitled "METHOD FOR DESIGNING A CIRCUIT FOR PROGRAMMABLE MICROCONTROLLERS," and U.S. patent application Ser. No. 09/989,817, filed Nov. 19, 2001, entitled "SYSTEM AND METHOD OF DYNAMICALLY RECONFIGURING A PROGRAMMABLE SYSTEM ON A CHIP," all of which are incorporated herein by reference

FIELD OF THE INVENTION

Embodiments of the present invention generally relate to the field of software interfaces and methods for programming and/or developing integrated circuits. More specifically, embodiments of the present invention pertain to a graphical user interface (GUI) and method for programming a dynamically reconfigurable integrated circuit.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages over discrete component circuits. However, traditional design and manufacturing approaches for integrated circuits are often very complex and consume significant resources.

Electronic systems often rely upon a variety of components included in integrated circuits to provide numerous functions. Microcontrollers are one example of integrated circuit components with characteristics that are potentially useful in a variety of applications. For example, microcontrollers are typically reliable and relatively economical to produce. Microcontrollers have evolved since they were first introduced and have substantially replaced mechanical and electromechanical components in numerous applications and devices. However, while traditional microcontrollers have some characteristics that are advantageous, they also tend to be limited in the number of applications in which any given microcontroller integrated circuit can be utilized.

Traditionally each microcontroller is custom designed precisely for a narrow range of applications with a fixed combination of required peripheral functionalities. Developing custom microcontroller designs with particular fixed peripherals is time and resource intensive, typically requiring separate and dedicated manufacturing operations for each different microcontroller (which is particularly expensive for small volume applications). Even if a microcontroller may suffice for more than one application, the range of those applications may be somewhat limited. For example, completely different and totally separate integrated circuits are generally used for disparate applications such as monitoring ambient temperature over time and transmitting the time/temperature data to a remote location, or detecting light and controlling the operation of a motor, or playing an audio recording and receiving/checking digital security information.

Application specific integrated circuits (ASICs) may appear to address some of the above issues, but they can present significant hurdles. ASICs tend to require sophisticated design expertise, high development costs, and large volume requirements. To the extent some flexibility may be provided by the inclusion of gate arrays or other logic devices, the traditional approaches remain expensive and require a sophisticated level of design expertise. In addition, traditional integrated circuit configurations and configuration are typically set during initial manufacture and are not readily adaptable to changing conditions in the field.

Traditional integrated circuits typically have a predetermined set configuration and configuration that do not conveniently facilitate dynamic changes. Typically, one set of components is included and set to perform one function and a second set of components perform another function. Many applications require a variety of different functions, resulting in significantly increased resource commitments where the configuration is "hard-wired" into the design. Providing circuit components dedicated to single functions may results in less than the most efficient utilization of those dedicated components. For example, numerous functions in a variety of applications are performed infrequently or intermittently, and the valuable resources committed to these activities sit idle for much of the time. In addition, in some applications, functions are performed sequentially, with a second group of components dedicated to later activities sitting idle waiting on input from a first group of components dedicated to earlier activities, and when the first group of components has finished, they sit idle while the second group performs their dedicated function.

Similarly, the purpose of particular external ports or pins is typically fixed, and traditional systems typically dedicate external ports or pins to very precise, well-defined purposes. Accomplishing additional or different interactions with external components sometimes requires additional dedicated external ports or pins which consume valuable resources that are typically limited. Some dedicated external ports or pins may be utilized infrequently (e.g., only on start-up) and/or required to wait while activities proceed via other external ports or pins.

What is desired is an interface, system and method that enables dynamic reconfiguration of a programmable device in a convenient and efficient manner.

SUMMARY

The present invention relates to a GUI, system and method for programming a dynamically reconfigurable electronic device (e.g., a programmable mixed signal integrated circuit, such as a programmable microcontroller, data communications device or clock device). In one embodiment of the present invention, the GUI enables easy and efficient switching between different configurations while preserving and/or monitoring the validity of the different configuration states. In one exemplary embodiment, the present invention is implemented in software for dynamically programming different configurations and functions of a microcontroller having integrated, configurable analog and digital/mathematical blocks of circuitry. A plurality of different configuration images may be utilized to define the different configurations and functions and facilitate allocation of programmable components included in the electronic device accordingly.

In one embodiment, the GUI is used to program a microcontroller that further includes configurable analog and digital/mathematical blocks of circuitry, all on a single substrate. (The term "configurable digital/mathematical block of circuitry" as used herein refers to a configurable digital block of circuitry that has been at least partially optimized to perform a variety of mathematical functions, such as counting, incrementing, adding, subtracting, multiplying, dividing, etc.)

In a preferred embodiment, the microcontroller (which may be as described in U.S. patent application Ser. No. 10/033,027, may further include a microprocessor, a plurality of internal peripherals, an interconnecting component, an external coupling port, and a memory for storing instructions. The microprocessor processes information. The plurality of internal peripherals (which may be configured from the configurable analog and digital/mathematical blocks of circuitry) are programmably configurable to perform a variety of functions associated with the microcontroller. The interconnecting component may be programmably configurable for selectively interconnecting the internal peripherals and other internal microcontroller components. The external coupling port may be programmably configurable to implement different connectability states by which the electronic system is connectable to an external device. The memory may store instructions and data (e.g., a configuration image) directed at setting the configurations and functions allocated to the plurality of internal peripherals, the interconnecting component and the external coupling port.

DRAWINGS

DETAILED DESCRIPTION OF THE INVENTION

Figure 1:
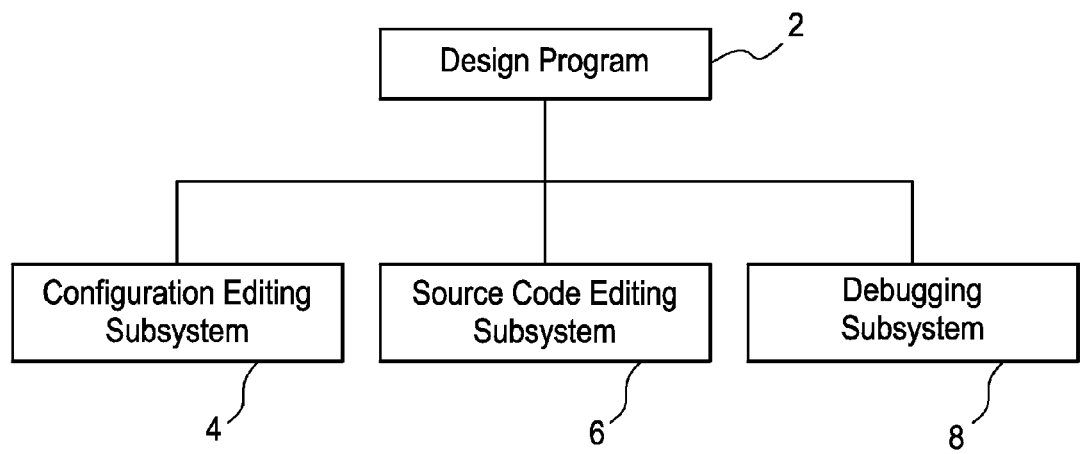
FIG. 1 is a box diagram showing a high-level architectural overview of an exemplary programmable device design/development software program and its primary components.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer, processor, controller and/or memory. These descriptions and representations are the means generally used by those skilled in data processing arts to effectively convey the substance of their work to others skilled in the art. A procedure, logic block, process, etc., is herein, and is generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention concerns an interface, method and system for dynamically (re)programming a programmable electronic device, comprising one or more configuration workspaces for configuring the programmable electronic device such that it has different functionalities at different times, and a separate "reconfiguration operations" workspace for adding, deleting, opening, closing, importing, exporting, saving and/or selecting a configuration and/or its corresponding workspace. The graphical depiction of a particular device configuration in a workspace on the screen or monitor of a general purpose computer or PC configured to run a software tool that includes the present interface is sometimes referred to as an "overlay."

For a given reprogrammable device having different time-multiplexed configurations and/or functionality, the software tool that designs, programs or configures each such configuration and/or functionality will have a number of viewing screens, windows or workspaces corresponding to the number of device configurations and/or functionalities. The view screen(s), window(s) or workspace(s) corresponding to a given/unique device configuration and/or functionality may sometimes be known as an "overlay." Thus, the software design, program, data file set or configuration(s) for a given reprogrammable device having different time-multiplexed configurations and/or functionality (a so-called "project") may contain multiple overlays.

Each overlay may be considered to be a hardware design within the programmable electronic device that exists at a given point in time to perform a given function. One overlay may be replaced or augmented (or partially replaced and partially augmented) by another overlay within the same project, to enable the device to perform two different functions (or have two different performance capabilities) at two different times. The two overlays map onto the same hardware resources in the device, and therefore, should be (and preferably are) time-multiplexed (i.e., operable in the device at mutually exclusive times, or configured such that at most one overlay is operable in the device at any given time). As a result, different functions and/or performance capabilities can be time-multiplexed within a single (re)programmable device by virtue of different overlays (e.g., different configuration data sets) that may be stored in memory that is in communication with the device. In the present system, such memory (which may be volatile, such as dynamic and/or static random access memory, non-volatile, such as EPROM, EEPROM, or flash memory, or both) is preferably on the same die as the electronic device (i.e., is monolithic).

In one embodiment, the programmable electronic device can be reconfigured dynamically; e.g., the different configurations and/or functionalities may be swapped or switched (partially or fully) "on the fly." At one instant in time, the device can configured using a first set of partially or fully programmed (and optionally pre-programmed) modules to transmit electrical signals (an exemplary "first overlay"), then within the time a processor takes to unload and load a set of registers or register banks, the same device can be reprogrammed with a second set of partially or fully programmed (and optionally pre-programmed) modules to receive electrical data signals (an exemplary "second overlay").

The present invention relates to an interface, system and method that enables such dynamic reconfiguration of a programmable electronic device, notably through software tools, operations, instructions and/or code that allows one to design, configure, create or modify multiple overlays or configurations, the active states of which are operably time-multiplexed in the device. For example, within a module or component placement and/or configuration workspace displayed by such software operating in a suitable computing environment, one may switch back and forth between different overlays to easily compare functional and/or performance (parameter value) similarities and differences between the different overlays. Thus, in a preferred embodiment in the present interface and system provides the first configuration with instructions, programming and/or information sufficient to enable reconfiguration of the device from said first configuration to said second, different configuration.

In a preferred embodiment, a tool having such a "reconfiguration operation" GUI for operating on overlays within a project created with the tool can also compute the hardware resources that are shared and/or that are different and/or not compatible between the different overlays. Such capability is useful because it enables the programmer to reprogram only those features, parameters and/or hardware resources that differ between the different overlays. Resources, features and/or parameters that are common to the different overlays need not be reprogrammed.

The present invention is related to several U.S. patent applications which are incorporate herein by reference. U.S. patent application Ser. No. 10/033,027, filed Oct. 22, 2001, entitled "MICROCONTROLLER PROGRAMMABLE SYSTEM ON A CHIP," describes a programmable microcontroller having configurable analog and digital blocks of circuitry that solves a number of the above-described obstacles. U.S. patent application Ser. No. 09/989,570, filed Nov. 19, 2001, entitled "METHOD FOR FACILITATING MICROCONTROLLER PROGRAMMING," describes a method, interface, software and system for designing and/or programming a circuit (such as a microcontroller) having configurable, programmable functions that can be embodied in configurable analog and/or digital blocks. U.S. patent application Ser. No. 09/989,571, filed Nov. 19, 2001, entitled "METHOD FOR DESIGNING A CIRCUIT FOR PROGRAMMABLE MICROCONTROLLERS," describes a methodology, interface, software and system by which a user programs and/or configures a programmable microcontroller having configurable and/or programmable functions that can be embodied in configurable analog and/or digital blocks of circuitry.

U.S. patent application Ser. No. 09/989,574, filed Nov. 19, 2001, entitled "METHOD AND SYSTEM FOR USING A GRAPHICS USER INTERFACE FOR PROGRAMMING AN ELECTRONIC DEVICE," describes a method, system and GUI for programming and/or configuring such a programmable microcontroller. U.S. patent application Ser. No. 09/989,817, filed Nov. 19, 2001, entitled "SYSTEM AND METHOD OF DYNAMICALLY RECONFIGURING A PROGRAMMABLE SYSTEM ON A CHIP," describes an improved programmable electronic device wherein instructions stored in memory facilitate dynamic reconfiguration of the device. Based upon the existence of a predetermined condition, the electronic device is automatically reconfigured by activating different configuration images.

FIG. 1 is a block-level overview of an exemplary software program or tool 2 for designing, configuring and/or programming a programmable electronic device, such as a mixed signal integrated circuit having configurable analog and/or digital circuit/function blocks (see, e.g., U.S. patent application Ser. No. 10/033,027, In a preferred embodiment, the tool 2 is exemplified by PSoC Designer™ software (for designing and/or configuring programmable analog and/or digital functional blocks and/or modules of circuitry in a programmable integrated circuit; see version 3.10, available from Cypress MicroSystems, Inc., Bothell, Wash., or from the world wide web at http://www.cypressmicro.com/).

Tool 2 may contain one or more component subsystems: a device configuration editing subsystem 4 (known as "Device Editor" in PSoC Designer™ software), a source code editing subsystem 6 (known as "Application Editor" in PSoC Designer™ software), and a debugging subsystem 8 (known as "Debugger" in PSoC Designer™ software). A preferred embodiment of the present system comprises at least device configuration editing subsystem 4. Source code editing subsystem 6 enables further customization of device configurations and operation(s), and debugging subsystem 8 enables testing of device configuration(s) and/or programming. Thus, although preferred, subsystems 6 and 8 are optional in the present invention. For detailed descriptions of particularly preferred, working embodiments of device configuration editing subsystem 4, source code editing subsystem 6, and debugging subsystem 8, see the PSoC Designer IDE User Guide, version 1.13 (available from Cypress MicroSystems, Inc., Bothell, Wash., or from the world wide web at http://www.cypressmicro.com/).

Figure 2:
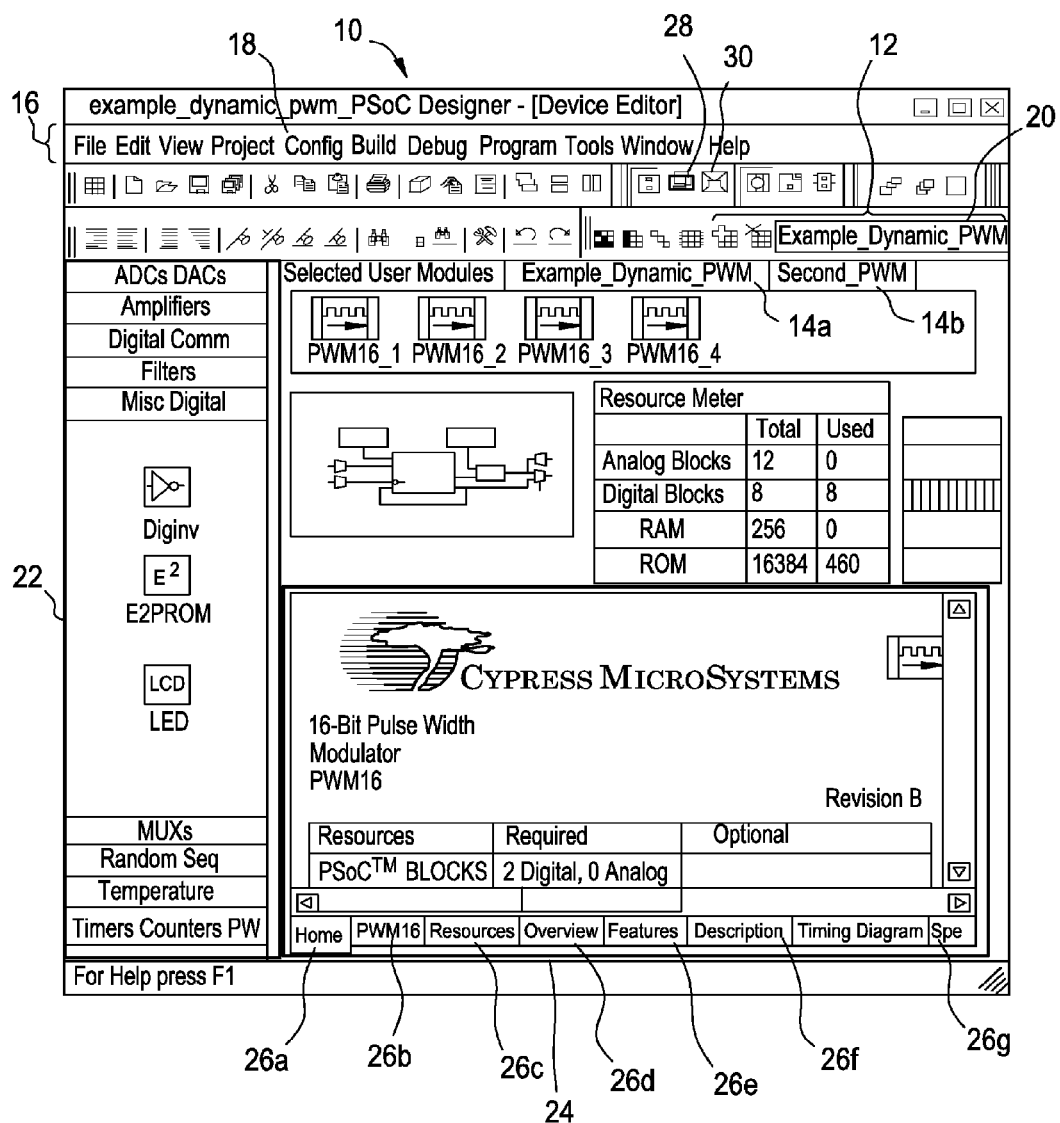
FIG. 2 is a screen view of a first configuration for an exemplary programmable device, as seen in a user module/datasheet view of the configuration editing subsystem component of FIG. 1.

FIG. 2 shows an exemplary functional block or module "selection" view 10 within configuration editing subsystem 4 of tool 2 in FIG. 1. (For a general description of an exemplary configuration editing subsystem 4, see, e.g., U.S. patent application Ser. Nos. 09/989,570 and 09/989,571, each of which was filed Nov. 19, 2001.) In FIG. 2, the present interface is embodied in toolbar 12, which is sometimes referred to herein as a "reconfiguration operation" toolbar, and tabs 14*a* and 14*b*, which are sometimes referred to herein as "overlay" or "configuration" tabs. Alternatively (or additionally), the present interface can be implemented as a dropdown list in box 20 (which, as shown, may be contained within workspace 12) and/or as one or more commands (each of which may optionally contain one or more subcommands) under a heading in menu 16, such as "Config" 18.

The configuration workspace(s) in the present graphical user interface may contain commands, operations and/or instructions for adding a new or existing configuration, deleting an existing or open configuration, saving an open configuration, importing a saved configuration, exporting a completed configuration, and/or selecting between at least first and second configurations. Preferably, the commands and/or operations carried out through the interface comprise adding a configuration, deleting a configuration, and selecting a different configuration, more preferably further including importing a configuration and exporting a configuration.

Figure 6:
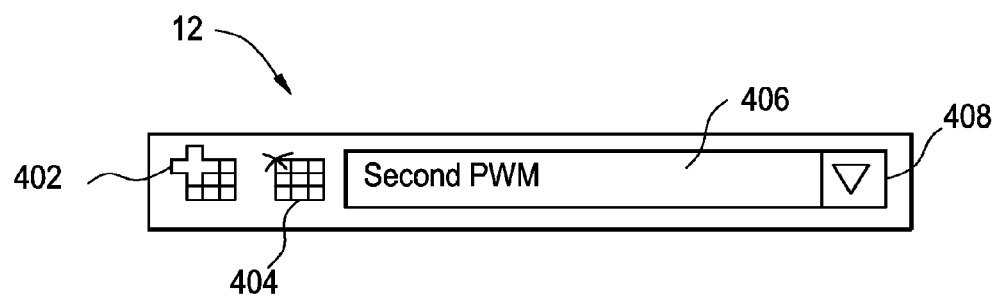
FIG. 6 shows a toolbar (GUI) configured for adding, deleting or switching between configurations in an exemplary dynamic reconfiguration process.
Figure 7:
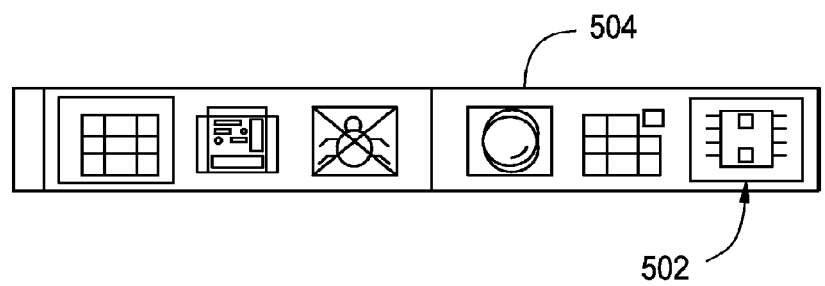
FIG. 7 shows an icon-based GUI for selecting between the different subsystems in the program of FIG. 1 and between different exemplary views of the configuration editing subsystem component of FIG. 1.

Referring now to FIG. 6, toolbar 12 comprises a plurality of icons 402 and 404 and down-arrow box 406. Icons 402 and 404 carry out reconfiguration operations, such as adding a new configuration (e.g., icon 402) or deleting an open configuration (e.g., icon 404). These icons are not required to practice the present invention; menu- and down-arrow-based alternatives are described elsewhere herein. Additional or alternative icons can be added or substituted for additional or other commands, functions or operations. Down-arrow box 406, when activated by clicking on down-arrow 408, explodes into a list (not shown) containing the names of all overlays in the project. Optionally, this "down-arrow list" may further include a selection/entry for a new configuration (e.g., "[New Config]"). It is noted that the overlay shown in down-arrow box 406, named "Second_PWM," differs from the overlay shown in down-arrow box 20 in FIG. 1 (from a working embodiment; see elsewhere herein for details).

Figure 3:
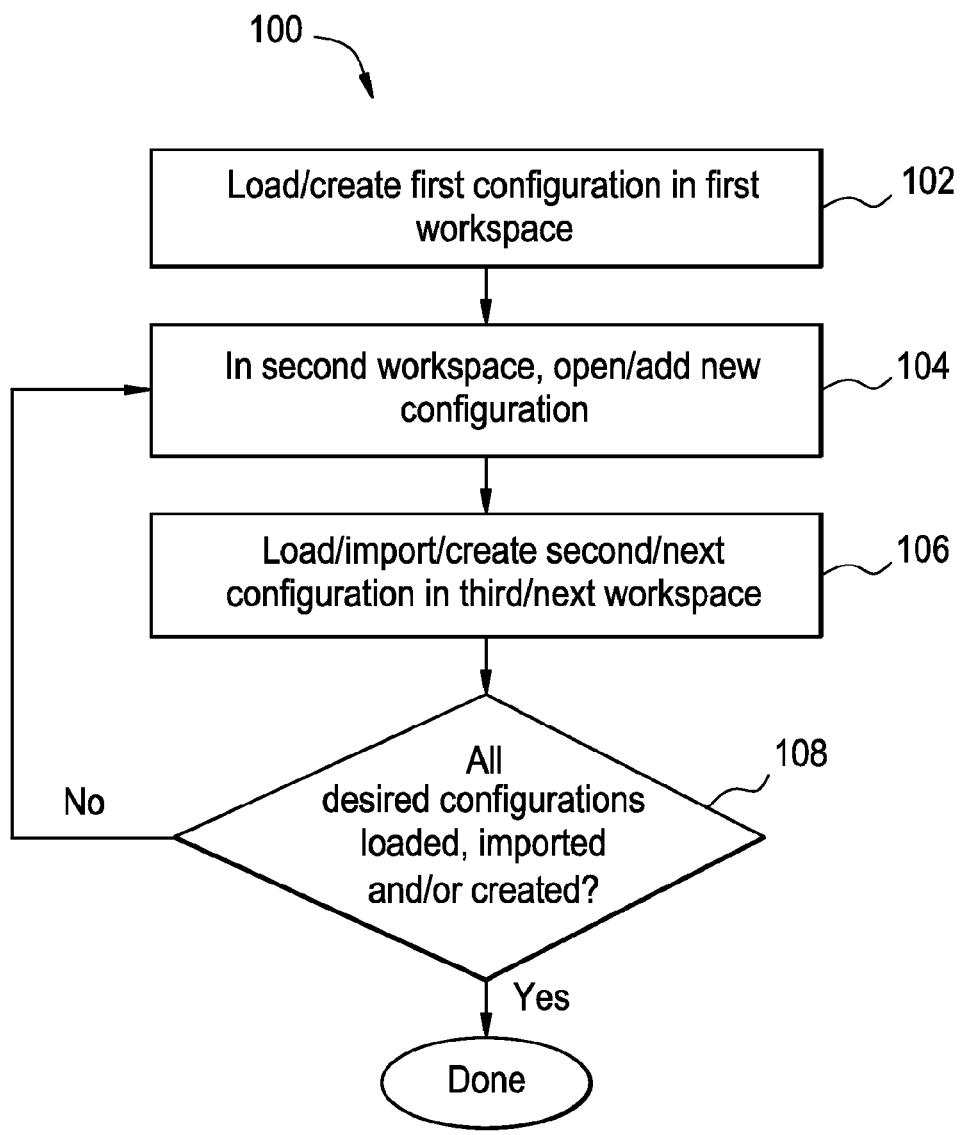
FIG. 3 is a flow chart describing a basic dynamic reconfiguration process.

FIG. 3 is a flow chart of dynamic reconfiguration method 100, one embodiment of the present invention. In step 102, a first configuration (or "overlay") is loaded or created in a first (configuration and/or placement) workspace. The workspace(s) for configuring, designing, developing or modifying an overlay may have a plurality of different subworkspaces (in FIG. 2, see, e.g., [preconfigured] user module selection workspace 22, user module configuration workspace 24), each of which may have a plurality of different selectable views (in FIG. 2, see, e.g., tabs 26*a*-26*g*).

At any point (but preferably after the first configuration/overlay has been loaded and/or is otherwise completed and/or functionally operable), in step 104, one may activate (e.g., open, add or select) a new configuration in a second (e.g., "reconfiguration operation") workspace. Preferably, the software tool is configured (using conventional techniques) such that the first configuration or overlay defines a set of valid (e.g., allowed, permissible and/or legal) states for the second, new configuration or overlay. Conversely, the software tool is also preferably configured (using conventional techniques) such that the first configuration or overlay enables a highlighting or alerting function in the second, new overlay when an invalid configuration or state (e.g., not allowed, impermissible and/or illegal) is entered, designed, programmed or configured therein.

In step 106, one configures (e.g., creates, designs, develops, loads and/or modifies) the second (or next incremental) configuration or overlay for the device in a third (or next incremental) configuration or placement workspace. The workspace for the second (or next incremental) configuration or overlay may occupy the same or different display area as the workspace for the first (or any previous) configuration or overlay. Preferably, the default workspace areas for each overlay are coextensive (i.e., the same). However, and preferably, a user may adjust the workspace boundaries for a given overlay in a project as desired. Thus, the workspaces for different overlays may not necessarily coincide, and they can be adjusted or modified such that two or more overlays are partially or completely visible (but, preferably, only one configuration workspace at a time is active, to avoid potential automatic source code generation errors).

Decision point 108 is where the user decides whether to create a new, incremental overlay. If, for example, after two overlays have been created, the user determines that all desired time-multiplexed device functionalities in the project have been loaded, imported, created and/or added, the user is done. On the other hand, for example, if the user determines that, after two overlays have been created, more time-multiplexed device functionalities are desired in the project, the user may return to step 104 and activate a new, incremental overlay in the second (reconfiguration operation) workspace. The cycle of steps 104, 106 and 108 may be repeated as often as the user likes, until all of the desired time-multiplexed device functionalities, configurations and/or performance capabilities have been designed into the project.

In one embodiment of the present invention, the configuration images are provided by a design tool (e.g., a computer implemented software design tool). Additional details on an exemplary implementation of a present invention design tool are set forth in co-pending commonly-owned U.S. patent application Ser. No. 09/989,570 filed Nov. 19, 2001, entitled "METHOD FOR FACILITATING MICROCONTROLLER PROGRAMMING", which is incorporated herein by reference, and U.S. patent application Ser. No. 09/989,819 filed Nov. 19, 2001, entitled "A SYSTEM AND METHOD FOR CREATING A BOOT FILE UTILIZING A BOOT TEMPLATE", also incorporated herein by reference.

In one further embodiment, the design process embodied in design program 2 (FIG. 1) and the reconfiguration development process 100 (FIG. 3) may be carried out by a computer system under the control of computer-readable and computer-executable instructions directed at implementing such a process. One embodiment of an exemplary computer system utilized to implement design tool process 400 is set forth in incorporated U.S. patent application Ser. No. 09/989,570, filed Nov. 19, 2001, entitled "METHOD FOR FACILITATING MICROCONTROLLER PROGRAMMING". The computer-readable and computer-executable instructions reside, for example, in data storage features of the computer system such as a computer usable volatile memory, computer-usable non-volatile memory and/or data storage device. The computer-readable and computer-executable instructions direct the computer system operation (e.g., a processor) in accordance with the process of design tool 2 and/or dynamic reconfiguration flow 100.

Although specific steps are disclosed in process 100 of FIG. 3, such steps are exemplary. That is, the present invention is well suited to use with various other steps or variations of the steps recited in process 100. Additionally, for purposes of clarity and brevity, the discussion is directed at times to specific examples. The present invention, design tool 2 and/or process 100, however, are not limited to designing a sole particular target device (e.g., a mixed signal device and/or microcontroller). Instead, the present invention is well suited to use with other types of computer-aided hardware and software design systems in which it may be desirable to accomplish a multitude of tasks as part of an overall process directed at designing an electronic device.

One aspect of the invention described herein includes the generation of automatic interrupts and/or "API's," by the software tool that contains, configures and/or controls the present interface. The interrupts and/or "API's," load, unload and/or reload the device registers, effectively reprogramming and/or reconfiguring the device to conform with a different overlay. Each overlay contains a set of instructions, tables and/or data (which may be compiled from one or more sets of corresponding instructions, tables and/or data in one or more user modules incorporated into the overlay) that generate the API's in accordance with the programming and/or configuration in the overlay. For example, if a first overlay defines an event monitor (e.g., a temperature or light sensor), then that first overlay is configured to generate an API when the event being monitored occurs. At that point, the API unloads the first overlay and loads a second overlay (which may be a data transmitter, UART or modem that reports the occurrence of the event). Alternatively, an API can be generated from a preset timer (for which a variety of user modules exist), for applications in which collection and/or reporting of data at specific time intervals is desired.

EXAMPLE

PSoC Designer software (version 3.10, dated Apr. 16, 2002; for designing and/or configuring programmable analog and/or digital functional blocks and/or modules of circuitry in a programmable integrated circuit) was downloaded from the Cypress MicroSystems, Inc., web site (at http://www.cypressmicro.com/) onto a Gateway Solo laptop computer having at least the minimum requirements for installing and operating the software. The software was installed according to the provider's instructions. After rebooting to allow new computer settings to take effect, the PSoC Designer software was launched and the "Dynamic PWM example" project (time-multiplexed pulse width modulator) was loaded.

The PSoC Designer IDE User Guide, version 113, was also downloaded onto the Gateway Solo laptop computer. Section 6 of the User Guide was consulted for reference to dynamic reconfiguration.

Dynamic reconfiguration allows for microcontroller applications to dynamically load and unload configurations. With this feature, a single MCU can have multiple functions. Upon installing and launching an appropriate version of software that contains dynamic reconfiguration capabilities, an example project that has multiple configurations was selected.

In the Start dialog box, a subsystem icon (preferably Device Editor) was selected by clicking on the icon, and C:\Program Files\Cypress Micro-Systems\Designer\ Examples\Example_Dynamic_PWM\Example_Dynamic_ PWM.SOC was opened. Using the example project, features of dynamic reconfiguration were sampled.

Adding a Configuration

To add a loadable configuration to the project, the following steps were executed (the designer, device editor, and target project files/workspaces were open). From the menu, Config >> Loadable Configuration >> New were clicked/ selected. Alternatively, the "New Configuration" (left-most) icon 402 in the dynamic reconfiguration toolbar 12 was clicked (see FIG. 6). The name of the new configuration is Config1 (and each additional configuration will take on consecutive numbering, i.e., Config2, Config3, Config4, etc.).

Upon the addition of a new configuration, a new tab 406 appeared directly below the dynamic reconfiguration toolbar 404, and a drop-arrow selection 408 appeared in the dynamic reconfiguration toolbar 404, both bearing the name Config1. The different project configurations were selected (or "moved between") by clicking on the corresponding tabs. Whichever tab is selected dictates the project configuration, regardless of the view. All views showed the settings or configuration for the project configuration of the current tab.

There is at least one tab with the project name when a project is created. This tab represents the base configuration and has special characteristics. In this embodiment of the software, the base configuration cannot be deleted but can be exported. Any new configuration, by default, has global settings and pin settings identical to the base configuration.

The configuration name (to be configuration or project specific) was changed by double-clicking (or right-clicking) the tab 406 and typing the new name. The new name appeared on the tab 406 and in the drop-arrow selection 408 in the dynamic reconfiguration toolbar 404. The configuration corresponding to that named in the tab 406 (and drop-arrow selection 408) now was the currently "loaded" working configuration.

The configuration process (i.e., selecting and placing user modules, setting up parameters, and specifying pinout) was conducted according to the procedures defined elsewhere in the PSoC Designer IDE User Guide, version 1.13, the relevant portions of which are incorporated by reference herein, and described generally in copending U.S. patent application Ser. Nos. 09/989,570 and 09/989,571, each of which was filed Nov. 19, 2001.

To avoid confusion in code generation, user module instance names should be unique across all configurations (i.e., a user module name in one configuration should not be re-used in a different configuration). Otherwise, the functions of all other icons and menu items in the software are identical to projects that do not employ additional configurations. In this embodiment of the software, additional configuration tabs appear in alphabetical order from left to right (beginning after the base configuration tab).

Importing a Configuration

In order to import an existing configuration (e.g., a .cfg file), the desired configuration to be imported must have been previously exported (i.e., the .cfg file generated). See the "Exporting a Configuration" section below for details. To import a loadable configuration to a project using dynamic reconfiguration, the following steps are executed (the designer, device editor, and target project files/workspaces were open):

1. From the menu, Config >> Loadable Configuration >> Import were each selected.
2. In the Import Loadable Configuration dialog box, the .cfg file to be imported was located (i.e., to be added to the open project). One may also specify whether to auto-load configuration information, which is done (in this embodiment, checked) by default.
3. "OK" was clicked.

Once the configuration was imported (added), it was loaded and ready for further developing, manipulating and/or configuring.

Exporting a Configuration

To export a loadable configuration from a project (to later be imported to a different project), the following steps were executed (the designer, device editor, and target project files/workspaces were open):
1. From the menu, Config >> Loadable Configuration >> Export were each selected/clicked.
2. In the Export Loadable Configuration dialog box, the configuration, by name, to be exported was selected/clicked (to be later imported to a project). One may select all configurations by holding the [Shift] key and dragging the mouse down, or alternatively, certain specific configurations may be selected by holding the [Ctrl] key and clicking only those desired configurations.
3. "OK" was clicked.
4. In the Save Loadable Configuration dialog box, the configuration name was typed and the file path designated. In this embodiment, notes could be added for later reference.
5. "OK" was clicked.

These steps created an exported configuration (e.g., a .cfg file) that can now be imported (added) to another project (see, e.g., "Importing a Configuration" above for details).

Deleting a Configuration

To delete a loadable configuration from your project, the following steps were executed (the designer, device editor, and target project files/workspaces were open):
1. From the menu, Config >> Loadable Configuration >> Delete were clicked. Alternatively, the "Delete Configuration" icon 404 (see FIG. 6) could be clicked, or tab 14a or 14b (see FIG. 2) of the configuration to be deleted could be right-clicked and "Delete" selected.
2. Once deleting the configuration was selected, the software asked to confirm the selection. "Yes" was clicked. (Alternatively, to cancel the "delete" operation, one may click "No.")

Once a configuration is deleted, the associated source files are removed from the project (if application files had been generated).

Global Parameters and Dynamic Reconfiguration

When employing dynamic reconfiguration, global parameters are set in the same manner as in a project having a single configuration. However, in this example of dynamic reconfiguration, changes to base configuration global parameters were propagated by default to all additional configurations. Therefore, global parameter changes made to an additional configuration are done locally to only that particular configuration. The code generation operation (Application Generation icon 28 in FIG. 2) considered global parameter changes made to some, but not all, configurations to determine compatibility issues and the possibility of invalid states between the different configurations. These so-called "local" global parameter changes should be made cautiously to prevent unexpected configuration incompatibility issues.

Pin Settings and Dynamic Reconfiguration

When employing dynamic reconfiguration, port pin settings are similar to global parameters in that all settings in the base configuration are propagated to additional configurations. When manually set, port pin settings become local to the configuration.

Port Pin Interrupts

Figure 4:
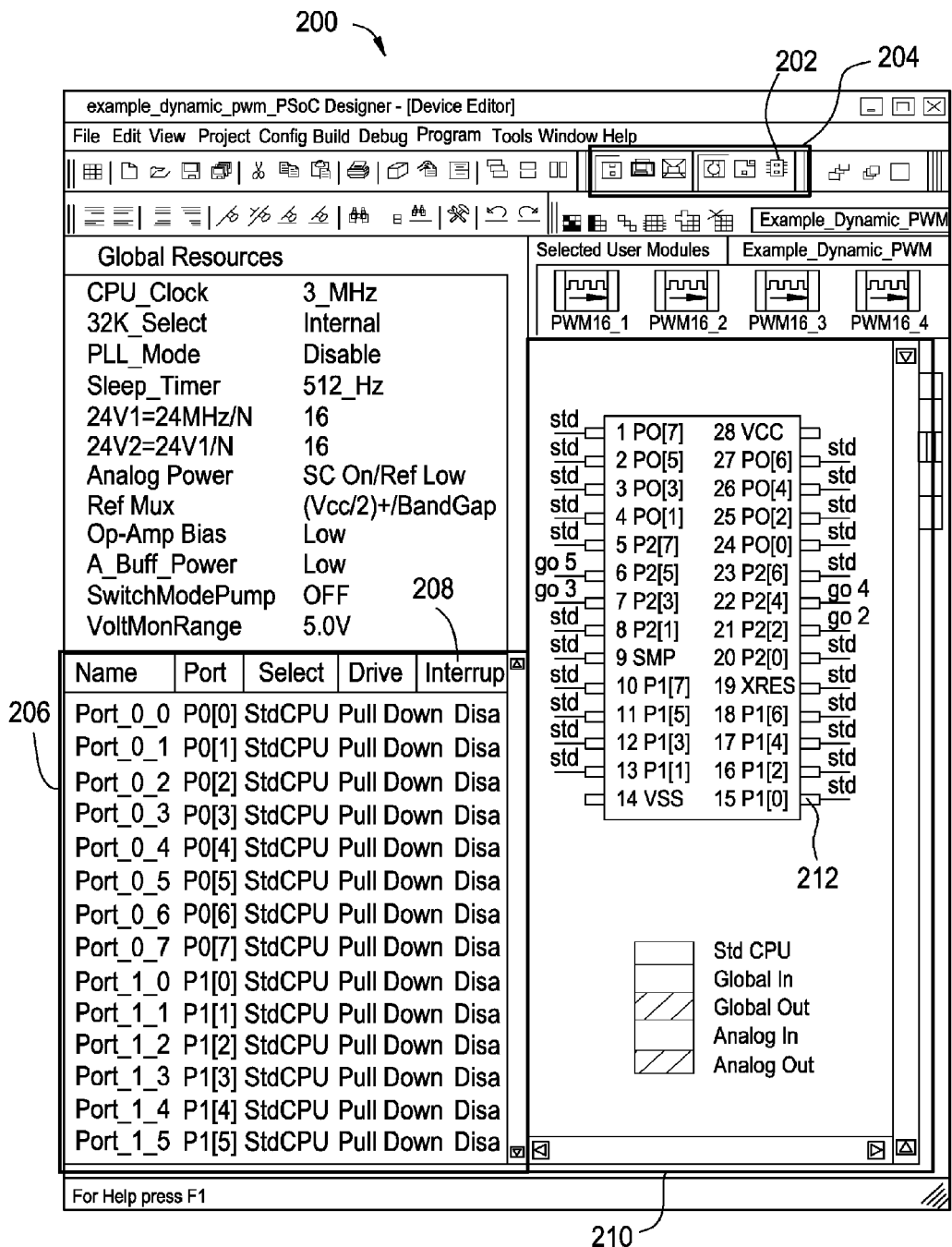
FIG. 4 is a screen view of the first configuration of FIG. 2, as seen in a pinout view of the configuration editing subsystem component of FIG. 1.

To enable port pin settings that are local to a particular configuration, port pin interrupts are created. To set port pin interrupts, execute the following steps:
1. The Pin-out View mode 200 of the device editor workspace was accessed by clicking on icon 202 in toolbar 204 (see FIG. 4).
2. The drop-arrow item 408 or tab 14a/14b was selected that corresponds to the configuration view for which port pin interrupts were to be set.
3. The pin interrupt was set in either of two places: (a) in the Pin Parameter Grid 206 (see FIG. 4), under the Interrupt column 208; or (b) through the pop-up menu (not shown) that appears when a pin (e.g., 212) in the pin-out diagram 210 is clicked.

In the Pin Parameter Grid 206, the drop-down list was accessed by clicking the drop-arrow (not shown) in the Interrupt column 208 and highlighting a selection. In the pop-up menu (not shown) on diagram 210, the interrupt setting appears in a list along with the select and drive options. Clicking the Port Pin Interrupt option enables the same drop-arrow selection as in the Pin Parameter Grid 206. A choice is selected by double-clicking.

The default pin interrupt setting is "Disable." In this embodiment, if all pin interrupts are set to "Disable," there is no additional code generated for the pin interrupts. If at least one pin is set to a value other than "Disable," code generation performs some additional operations. In boot.asm, the vector table is modified so that the GPIO interrupt vector has an entry with the name ProjectName_GPIO_ISR. Additional files (e.g., PSoCGPIOINT.asm and PSoCGPIOINT.inc) are generated as necessary and/or desired.

PSoCGPIOINT.asm contains an export and a placeholder label so the appropriate pin interrupt handling code can be entered. This file is generated once and treated in a similar way to the user module interrupt source files in that they are generated once, and then are not overwritten in subsequent code generation cycles.

PSoCGPIOINT.inc contains equates that are useful in writing the pin interrupt handling code. For each pin (with enabled interrupt or custom name), a set of equates are generated that define symbols for (i) the data address and bit, and (ii) the interrupt mask address and bit associated with the pin. In this embodiment, the naming convention for the equates is:
CustomPinName_DataADDR
CustomPinName_MASK
CustomPinName_IntEn_ADDR
CustomPinName_Bypass_ADDR
CustomPinName_DriveMode_0_ADDR
CustomPinName_DriveMode_1_ADDR
CustomPinName_IntCtrl_0_ADDR
CustomPinName_IntCtrl_1_ADDR The CustomPinName is replaced by the name entered for the pin during code generation. Custom pin naming allows one to change the name of the pin. The name field is included in the pin parameter area of the pin-out diagram.

The Name column in the Pin Parameter Grid 602 shows the names assigned to each of the pins. The default name shows the port and bit number. The name field may be double-clicked and the custom name typed in. In this embodiment, the name cannot include embedded spaces. The pin name is primarily used in code generation when the pin interrupt is enabled. The pin name may be appended to the equates that are used to represent the address and bit position associated with the pin for interrupt enabling and disabling, as well as testing the state of the port data.

Code Generation and Dynamic Reconfiguration

When more than one configuration is present in a project, there is a considerable difference in code generation and the files generated, although the user module files may be generated identically to previous versions. Differences are described below.

PSoCConfig.asm

The static PSoCConfig.asm file contains exports and code for:

LoadConfigInit: Initial configuration-loading function
LoadConfig_projectname: Load configuration function and code only for:

LoadConfig: General load registers from a table

For projects with more than one configuration, a variable is added to the bottom of the file that tracks the configurations that are loaded. The LoadConfig function does not change at all. The LoadConfig_projectname function includes a line that sets the appropriate bit in the active configuration status variable. The name of this variable is fixed for all projects. Additional variables that shadow the "write only" registers are added when useful and/or needed.

Additional functions named LoadConfig_configurationname are generated with exports that load the respective configuration. These functions are the equivalent of the LoadConfig_projectname function, including the setting of the bit in the active configuration status variable. The only difference is that LoadConfig_configurationname loads values from LoadConfigTBL_configurationname_Bankn, and there is some additional code that manages the values of any global registers that are changed in the configuration relative to the base configuration.

For each LoadConfig_xxx function, an UnloadConfig_xxx function is generated and exported to unload each configuration, including the base configuration. The UnloadConfig_xxx_Bankn operations are similar to the LoadConfig_xxx functions except that they load an UnloadConfigTBL_xxx_Bankn register (or register set or bank) and clear a bit in the active configuration status variable. In these functions, the global registers are restored to a state that depends on the currently active configuration.

With regard to the base configuration, UnloadConfig_xxx and ReloadConfig_xxx functions are also generated. These functions load and unload only user modules contained in the base configuration. When the base configuration is unloaded, the ReloadConfig_xxx function must be used to restore the base configuration user modules. The ReloadConfig_xxx function ensures the integrity of the "write only" shadow registers. Respective load tables are generated for these functions in PSoCConfigTBL.asm.

An additional unload function is generated as UnloadConfig_Total, which loads tables UnloadConfigTBL_Total_Bank0 and UnloadConfigTBL_Total_Bank1. These tables include the unload registers and values for all blocks. The active configuration status variable is also set to 0. The global registers are not set by this function.

The name of the base configuration matches the name of the project. The project name changes to match the base configuration name if the name of the base configuration is changed from the project name.

A "C" callable version of each function is defined and exported so that these functions can be called from a "C" program.

PSoCConfigTBL.asm

PSoCConfigTBL.asm contains the personalization data tables used by the functions defined in PSoCConfig.asm. For static configurations, there are only two tables defined: LoadConfigTBL_projectname_Bank0 and LoadConfigTBL_projectname_Bank1, which support the LoadConfig_projectname function. These tables personalize the entire global register set and all registers associated with blocks that are used by user modules placed in the project.

For projects with additional configurations, a pair of tables are generated for each LoadConfig_xxx function generated in PSoCConfig.asm. The naming convention follows the same pattern as LoadConfig_xxx and uses two tables: LoadConfigTBL_xxx_Bank0 and LoadConfigTBL_xxx_Bank1. UnloadConfigTBL_xxx_Bank0 and UnloadConfigTBL_xxx_Bank1 are used by UnloadConfig_xxx. The labels for these tables are exported at the top of the file.

The tables for the additional configurations' loading function differ from the base configuration load table in that the additional configuration tables only include those registers associated with blocks that are used by user modules placed in the project and only those global registers with settings that differ from the base configuration. If the additional configuration has no changes to the global parameters or pin settings, only the placed user module registers are included in the tables.

The tables for additional configurations' unloading functions include registers that deactivate any blocks that were used by placed user modules, and all global registers which were modified when the configuration was loaded. The registers and the values for the blocks are determined by a list in the device description for bitfields to set when unloading a user module, and are set according to the type of block. The exceptions are the UnloadConfigTBL_Total_Bankn tables, which include the registers for unloading all blocks.

boot.asm

The boot.asm file is generated similarly to a project that has no additional configurations unless there are one or more configurations that have user modules placed in such a way that common interrupt vectors are used between configurations. In this case, the vector entry in the interrupt vector table will show the line "ljmp Dispatch_INTERRUPT_n" instead of a user module defined Interrupt Service Routine.

New Files

There are three new files that are generated when additional configurations are present in a project (while the exemplary file names given below may be changed, the corresponding functions will be the same regardless of the actual file names used):

PSoCDynamic.inc
PSoCDynamic.asm
PSoCDynamicINT.asm

The PSoCDynamic.inc file contains a set of equates that represent the bit position in the active configuration status variable, and the offset to index the byte in which the status bit resides if the number of configurations exceeds eight. A third equate for each configuration indicates an integer index representing the ordinal value of the configuration.

The PSoCDynamic.asm file contains exports and functions that test whether a configuration is loaded or not. The naming convention for these functions is IsOverlayNameLoaded.

The PSoCDynamicINT.asm file is generated only when the user module placement between configurations results in both configurations using a common interrupt vector. The reference to Dispatch_INTERRUPT_n function is resolved in this file. For each conflicting interrupt vector, one of these ISR dispatch sets is generated. The ISR dispatch has a code section that tests the configuration that is active and loads the appropriate table offset into a jump table immediately following the code. The length of the jump table and the number of tests depends on the number of user modules that need the common vector rather than the total number of configurations. The number of conflicts can equal the number of configurations if each configuration utilizes the common interrupt vector. Generally, there will be fewer interrupt conflicts on a per vector basis.

The Application (Source Code) Editor Workspace and Dynamic Reconfiguration

Figure 5:
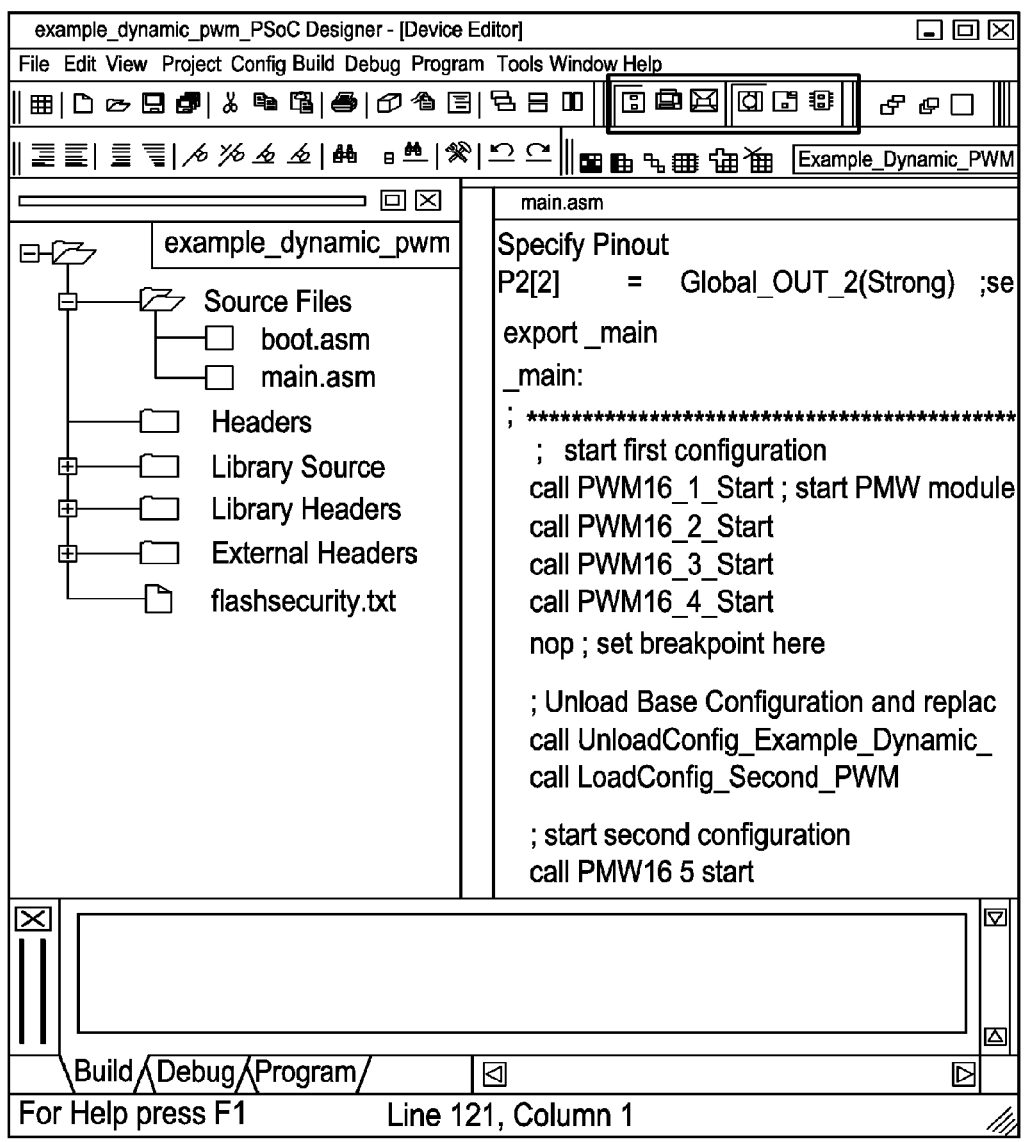
FIG. 5 is a screen view of the source code editing subsystem component of FIG. 1 for the exemplary programmable device of FIG. 2.

The application (e.g., source code) editor (see, e.g., FIG. 5) operates essentially as set forth in the PSoC Designer IDE User Guide, version 1.13, and as described generally in copending U.S. patent application Ser. Nos. 09/989,570 and 09/989,571, each of which was filed Nov. 19, 2001. The additional files generated are placed in the Library Source and Library Headers folders of the source tree. Library source files that are associated with an additional configuration are shown under a folder with the name of the configuration. This partitions the files so that the source tree view is not excessively long.

The Debugger Workspace and Dynamic Reconfiguration

A debugging subsystem in the downloaded software now displays currently loaded configuration names and input/output (I/O) register labels during debugging halts. The I/O register grid labels are compiled from the labels for all currently loaded configurations.

The names of loaded configurations are displayed in a new debugging view (see, e.g., menu item 30 in FIG. 2). The new view is a new tab titled "Config" below the memory map (which already contains RAM, I/O Banks 0,1, and Flash tabs).

The I/O register labels modify the existing I/O register bank grids. In addition to setting I/O register labels on entry to the debugger workspace, labels are updated on M8C (microcontroller) halts if the set of loaded user modules has changed since the last halt.

The debugger workspace obtains the active configuration names from the runtime configuration data stored in M8C RAM. This data is maintained by the "LoadConfig" and "UnloadConfig" routines generated by the Device Editor software.

Active Configuration Display

The set of currently active configurations is displayed in the "Config" tab of the memory map during debugging software halts. The display lists all project configurations with the status for each currently loaded configuration marked "Active." The display may not be valid immediately after a reset. In this embodiment, the initialization code must run before the "Config" tab display is valid.

Active Configuration I/O Register Labels

The debugging software I/O register bank labels (Bank 0, Bank 1) are updated to match the user modules defined in the currently active configurations.

Active Configuration Limitations

The new displays are based on a bitmap of loaded configurations maintained by the "LoadConfig" and "UnloadConfig" routines, which are generated by the Device Editor software. This bitmap can get out-of-sync with the actual device configuration in several ways:

The bitmap's RAM area can be accidentally overwritten.

Overlapping (conflicting) configurations, loaded at the same time, may scramble the register labels.

If an overlapping configuration is loaded and then unloaded, register labels from the original configuration may be used, even though some blocks will have been cleared by the last "UnloadConfig" routine.

Active Configuration Display Test

The new display features can be tested with a single project that loads and unloads Configurations containing overlapping user modules. The test project should have a base configuration that defines one or more user modules and several overlay configurations, some conflicting and some not conflicting. The test project should load and unload configurations in various combinations. After each load and unload operation, the status of the active configuration display and the register label display should be checked.

Checking the displays after loading and unloading conflicting configurations is recommended.

CONCLUSION/SUMMARY

Thus, the present invention provides a convenient, simple and efficient interface for dynamically configuring an electronic device (e.g., a mixed signal integrated circuit such as a microcontroller).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A non-transitory machine memory adapted such that when read by one or more processors of a computer system, control signals and data are provided from the memory to the processors, resulting in:
   a) display of a first graphical user interface (GUI) workspace on an optical display device, the first workspace comprising a display of a first configuration of a programmable electronic device including configurable circuit blocks operable during a first time period;
   b) display of a second GUI workspace comprising a second configuration of the programmable electronic device, the second configuration operable during a second time period different than the first time period during which the first configuration is operable;
   c) display of a third GUI workspace including user interface elements responsive to human input via peripheral input devices, the third GUI workspace responsive to human inputs to the user interface elements to reconfigure the first configuration into the second configuration; and
   d) determination and storage of device configuration changes to evolve the first configuration into the second configuration during a transition from the first time period to the second time period.

2. The machine memory of claim 1, further adapted such that when read by one or more processors of a computer system, control signals and data are provided from the memory to the processors, resulting in:
   said second workspace comprising means for adding, deleting, saving, importing, exporting and/or selecting a configuration.

3. The machine memory of claim 1, further adapted such that when read by one or more processors of a computer system, control signals and data are provided from the memory to the processors, resulting in:
   said first and third workspaces each comprising a plurality of selectable views for configuring said circuit blocks.

4. The machine memory of claim 1, further adapted such that when read by one or more processors of a computer system, control signals and data are provided from the memory to the processors, resulting in:

said first configuration defining valid and invalid states for said second configuration.

5. The machine memory of claim 1, further adapted such that when read by one or more processors of a computer system, control signals and data are provided from the memory to the processors, resulting in:

said first workspace comprising a first set of configurable functions and/or parameter values, said third workspace comprising a second set of configurable functions and/or parameter values, and said second set of configurable functions and/or parameter values contains at least a subset of the first set of configurable functions and/or parameter values.

6. The machine memory of claim 1, further adapted such that when read by one or more processors of a computer system, control signals and data are provided from the memory to the processors, resulting in:

a fourth workspace for configuring the electronic device such that it has a third configuration at a third time period different than the first and second time periods.

7. The machine memory of claim 1, further adapted such that when read by one or more processors of a computer system, control signals and data are provided from the memory to the processors, resulting in:

said first configuration comprising instructions, programming and/or information sufficient to enable reconfiguration of said programmable electronic device from said first configuration to said second, different configuration.

8. The machine memory of claim 1, further adapted such that when read by one or more processors of a computer system, control signals and data are provided from the memory to the processors, resulting in:

said third workspace has a first view that is superimposable onto a corresponding second view in said first workspace.

9. The machine memory of claim 1, further adapted such that when read by one or more processors of a computer system, control signals and data are provided from the memory to the processors, resulting in:

said first configuration comprising global device parameter values, said second configuration comprising local device parameter values, and said local device parameter values comprising a subset of said global device parameter values.

10. The machine memory of claim 1, further adapted such that when read by one or more processors of a computer system, control signals and data are provided from the memory to the processors, resulting in:

said third workspace superimposable on said first workspace.

11. A process comprising:

displaying a first graphical user interface (GUI) workspace on an optical display device, the first workspace comprising a display of a first configuration of a programmable electronic device including configurable circuit blocks operable during a first time period;

displaying a second GUI workspace comprising a second configuration of the programmable electronic device, the second configuration operable during a second time period different than the first time period during which the first configuration is operable;

displaying a third GUI workspace including user interface elements responsive to human input via peripheral input devices, the third GUI workspace responsive to human inputs to the user interface elements to reconfigure the first configuration into the second configuration; and determining and storing device configuration changes to evolve the first configuration into the second configuration during a transition from the first time period to the second time period.

12. The process of claim 11, said second workspace comprising means for adding, deleting, saving, importing, exporting and/or selecting a configuration.

13. The process of claim 11, said first and third workspaces each comprising a plurality of selectable views for configuring said circuit blocks.

14. The process of claim 11, said first configuration defining valid and invalid states for said second configuration.

15. The process of claim 11, said first workspace comprising a first set of configurable functions and/or parameter values, said third workspace comprising a second set of configurable functions and/or parameter values, and said second set of configurable functions and/or parameter values contains at least a subset of the first set of configurable functions and/or parameter values.

16. The process of claim 11, further comprising:

generating a fourth workspace for configuring the electronic device such that it has a third configuration at a third time period different than the first and second time periods.

17. The process of claim 11, said first configuration comprising instructions, programming and/or information sufficient to enable reconfiguration of said programmable electronic device from said first configuration to said second, different configuration.

18. The process of claim 11, said third workspace has a first view that is superimposable onto a corresponding second view in said first workspace.

19. The process of claim 11, said first configuration comprising global device parameter values, said second configuration comprising local device parameter values, and said local device parameter values comprising a subset of said global device parameter values.

20. The process of claim 11, said third workspace superimposable on said first workspace.

\* \* \* \* \*